US010073185B2

(12) United States Patent
Moos

(10) Patent No.: US 10,073,185 B2
(45) Date of Patent: *Sep. 11, 2018

(54) PREDICTING HYDRAULIC FRACTURE PROPAGATION

(71) Applicant: Baker Hughes Incorporated, Houston, TX (US)

(72) Inventor: Daniel Moos, Palo Alto, CA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 379 days.

This patent is subject to a terminal disclaimer.

(21) Appl. No.: 14/745,622

(22) Filed: Jun. 22, 2015

(65) Prior Publication Data

US 2015/0301214 A1 Oct. 22, 2015

Related U.S. Application Data

(63) Continuation-in-part of application No. 12/979,116, filed on Dec. 27, 2010, now Pat. No. 9,063,251.

(51) Int. Cl.
*G01V 1/50* (2006.01)
*E21B 43/26* (2006.01)
(52) U.S. Cl.
CPC ............. *G01V 1/50* (2013.01); *E21B 43/26* (2013.01); *G01V 2210/646* (2013.01)
(58) Field of Classification Search
CPC ..... G01V 1/50; G01V 2210/646; E21B 43/26
See application file for complete search history.

(56) References Cited

U.S. PATENT DOCUMENTS

| 5,398,215 | A | 3/1995 | Sinha et al. |
|---|---|---|---|
| 5,654,938 | A | 8/1997 | Tang |
| 5,712,829 | A | 1/1998 | Tang et al. |
| 5,838,633 | A | 11/1998 | Sinha |
| 6,098,021 | A | 8/2000 | Tang et al. |
| 6,714,480 | B2 | 3/2004 | Sinha et al. |
| 6,850,168 | B2 | 2/2005 | Tang et al. |
| 6,904,365 | B2 | 6/2005 | Bratton et al. |
| 6,909,666 | B2 | 6/2005 | Dubinsky et al. |
| 6,930,616 | B2 | 8/2005 | Tang et al. |
| 6,985,086 | B2 | 1/2006 | Tang et al. |
| 7,035,165 | B2 | 4/2006 | Tang |
| 7,181,380 | B2 | 2/2007 | Dusterhoft et al. |
| 7,310,285 | B2 | 12/2007 | Donald et al. |
| 7,349,807 | B2 | 3/2008 | Moos et al. |
| 7,698,065 | B2 | 4/2010 | Moos et al. |

(Continued)

OTHER PUBLICATIONS

Int'l Search Report and Written Opinion in PCT/US2016/038547, dated Oct. 10, 2016.

(Continued)

*Primary Examiner* — Hovhannes Baghdasaryan
(74) *Attorney, Agent, or Firm* — Mossman, Kumar & Tyler, PC

(57) ABSTRACT

The present disclosure is related to methods and apparatuses for acoustic velocity well logging. The method may include estimating a magnitude of a principal horizontal stress in a borehole in a formation. The method may include obtaining a far field stress orientation and making a measurement of near borehole stress orientation. The present disclosure also includes an apparatus configured to be conveyed into a borehole and perform the method. Formation stresses and directions may be estimated.

21 Claims, 15 Drawing Sheets

(56) References Cited

U.S. PATENT DOCUMENTS

| | | |
|---|---|---|
| 2003/0150263 A1 | 8/2003 | Economides et al. |
| 2007/0168167 A1 | 7/2007 | Lou |
| 2009/0065252 A1 | 3/2009 | Moos et al. |
| 2009/0185446 A1 | 7/2009 | Zheng et al. |
| 2009/0205899 A1 | 8/2009 | Geerits et al. |
| 2009/0295393 A1 | 12/2009 | Bespalov et al. |
| 2010/0020639 A1 | 1/2010 | Sinha |
| 2010/0020642 A1 | 1/2010 | Sinha |
| 2010/0157730 A1 | 6/2010 | Bradford |
| 2010/0309748 A1 | 12/2010 | Tang et al. |
| 2012/0163123 A1 | 6/2012 | Moos |
| 2013/0292124 A1 | 11/2013 | Bunger et al. |

OTHER PUBLICATIONS

X. M. Tang et al.; "Identifying and Estimating Formation Stress From Borehole Monopole and Cross-Dipole Acoustic 1 Measurements," Paper QQ, 42nd Annual Meeting Transactions: Society of Professional Well Log Analysts, pp. 1-14 (1999).

B. K. Sinha et al.; "Stress-induced azimuthal anisotropy in borehole flexural waves," Geophysics, vol. 61, No. 6, pp. (1996). 1899-1907.

K. W. Winkler et al.; "Effects of borehole stress concentrations on Dipole anisotropy measurements," Geophysics, vol. 63, No. 1, pp. 11-17 (1998).

R. M. Alford; "Shear Data in the Presence of Azimuthal Anisotropy: Dilley, Texas," Expanded Abstracts, 56th SEG AnnualInternational Meeting, Houston, Nov. 2-6, pp. 476-479 (1986).

D. A. Castillo et al.; "Trap Integrity in the Laminaria High-Nancar Trough Region, Timor Sea: Prediction of Fault 5 Seal Failure Using Well-Constrained Stress Tensors and Fault Surfaces Interpreted From 3D Seismic," APPEA Journal, pp. 151-173 (2000).

D. Moos; "Geomechanics Applied to Drilling Engineering," Petroleum Engineering Handbook, vol. II, Larry W. Lake, Editor-in-Chief, SPE, pp. 1-87 (date unknown).

P. Peska et al.; "Compressive and tensile failure of inclined well bores and determination of in situ stress and rock strength," Journal of Geophysical Research, vol. 100, No. B7, pp. 12,791-12,811 (1995).

V. Pistre et al.,; "A Modular Wireline Sonic Tool for Measurements of 3D (Azimuthal, Radial, and Axial) Formation Acoustic Properties," Paper P, SPWLA 46th Annual Logging Symposium, pp. 1-13 (2005).

R. A. Plumb et al.; "A New Geomechanics Process Reduces Operational Risk from Exploration to Production," 9 ARMAINARMS 04-616, Gulf Rocks 2004, 6th North America Rock Mechanics Symposium (NARMS), Houston, Texas, 11 pages (2004).

C. M. Sayers et al.; "Microcrack-induced elastic wave anisotropy of brittle rocks," Journal of Geophysical Research, vol. 100, No. B3, pp. 4149-4156 (1995).

B. K. Sinha; "Near-wellbore characterization using radial profiles of shear slownesses," SEG Int'l Exposition and 74th Annual Meeting, Denver, Colorado, pp. 326-329 (2004).

B. K. Sinha et al.; "Estimation of Formation Stresses Using Radial Variation of Three Shear Moduli—A Case Study 12 From a High-Pressure and High-Temperature Reservoir in a Norwegian Continental Shelf," SPE 109842,2007 SPE Annual Technical Conference and Exhibition, Anaheim, California, pp. 1-9 (2007).

J. B. U. Haldorsen et al.; "Borehole Acoustic Waves," Oilfield Review, pp. 34-43 (2006).

A. S. Wendt et al.; "Enhanced Mechanical Earth Modelling and Wellbore Stability Calculations Using Advanced Sonic 14 Measurements—A Case Study of the HP/HT Kvitebjorn Field in the Norwegian North Sea," SPE 109662,2007 SPE Annual Technical Conference and Exhibition, Anaheim, California, pp. 1-16 (2007).

M. D. Zoback et al.; "Determination of stress orientation and magnitude in deep wells," International Journal of Rock Mechanics and Mining Sciences, 40, pp. 1049-1076 (2003).

Mao, et al.,"Estimation of In-Situ Stresses From Ultrasonic Measurements," SPE Formation Evaluation, Society of Petroleum Engineers (1986).

Int3 l Search Report and Written Opinion in PCT/US2011/066874, dated Sep. 27, 2012.

PREDICTING HYDRAULIC FRACTURE PROPAGATION

CROSS-REFERENCES TO RELATED APPLICATIONS

This application is a continuation-in-part of U.S. patent application Ser. No. 12/979,116, filed Dec. 27, 2010, issued Jun. 23, 2015 as U.S. Pat. No. 9,063,251, which is incorporated herein by reference in its entirety.

FIELD OF THE DISCLOSURE

The present disclosure is related to the field of acoustic well logging. More specifically, the present disclosure is related to methods of processing receiver signals from an acoustic well logging instrument to predict propagation of hydraulic fractures.

BACKGROUND OF THE ART

Hydraulic fracturing (also known as hydrofracturing, hydrofracking, or fracking) is a well known well-stimulation technique. The rock of a subterranean earth formation is fractured by a hydraulically pressurized fluid that typically includes water. The fluid may also include sand, other proppants (e.g., aluminum oxide), and/or chemicals. The fluid is injected into a wellbore at high pressure to create cracks in the deep-rock formations through which hydrocarbons can more freely flow. When the hydraulic pressure is removed from the well, small grains of proppant hold the fractures open. Recently, efforts have been made to model hydraulic fractures.

In an anisotropic formation, shear waves travel at different velocities with different propagating directions and polarizations. In borehole acoustic logging, the receivers are placed along the borehole axis so that only the wave traveling along the borehole axis is measured. Borehole acoustic logging can measure the shear wave anisotropy with different polarizations around the borehole which is sometimes referred to as the azimuthal anisotropy.

In most cases, an anisotropic rock can be modeled as a transverse isotropic (TI) material. For example, layered structures such as the structure of shale or layered fractures inside a rock can cause such anisotropy, which is sometimes referred to as intrinsic anisotropy. This material has one symmetry axis of infinite-fold rotational symmetry that is perpendicular to the layers. When the rock's symmetry axis is parallel to the borehole axis, there will be no observable shear wave anisotropy from acoustic logging since the shear modes propagating along the axis for this geometry have the same velocity regardless of the direction of polarization. This kind of configuration related to the borehole is sometimes referred to as vertically transverse isotropy (VTI).

If there is an angle between the symmetry axis and the borehole axis, the measured shear modes have two phase velocities corresponding to fast and slow modes with perpendicular polarization directions. In borehole dipole acoustic logging, azimuthal anisotropy may be observed when dipole modes are excited at different azimuthal directions. The configuration in which the rock's symmetry axis is perpendicular to the borehole axis is sometimes referred to as horizontally transverse isotropy (HTI). For HTI, the shear mode that is polarized along the fracture (or layer) direction has a faster velocity than the shear mode polarized perpendicular to the fractures.

Azimuthal anisotropy may also be induced by stress in earth formations. Before a borehole is drilled, the rock itself may be pre-stressed. Stress can change the rock's elastic properties so that the shear wave polarized along the largest principal stress may have a different shear velocity than shear waves polarized perpendicular to the largest principal stress. This kind of anisotropy has a different character than the intrinsic anisotropy in borehole acoustic logging. The stress will redistribute around the borehole after the well is drilled, so that the stress distribution (both its magnitude and direction) near the borehole may be very different from that far away from the borehole. The latter is considered to have the same stress condition as before the borehole is drilled. This stress re-distribution may cause the shear velocity to vary in both azimuthal and radial directions. A formation with intrinsic anisotropy is homogeneous around the borehole area, but the stress-induced anisotropy in such a medium is non-uniform.

SUMMARY OF THE DISCLOSURE

One general embodiment in accordance with the present disclosure is a method for characterizing an earth formation. The method may include obtaining at least one limited aperture measurement at frequencies greater than 20 kHz in a measurement borehole penetrating the earth formation and obtaining a principal direction of a near field stress using the at least one limited aperture measurement; obtaining a magnitude of a horizontal principal stress; using the principal direction of the near field stress and the magnitude of the horizontal principal stress to estimate a principal direction of a far field stress; and using the principal direction of the far-field stress to predict propagation of a hydraulic fracture to be produced in the formation. Obtaining the at least one limited aperture measurement may be carried out using at least one of: i) a limited aperture source; and ii) a limited aperture receiver. The method may include performing a formation modification operation in dependence upon the orientation.

The hydraulic fracture may be produced in the formation by injection of a fracturing fluid in an injection borehole. Predicting propagation of the hydraulic fracture may include predicting a predominant azimuth of the hydraulic fracture. The at least one limited aperture measurement may include a series of measurements over a range of frequencies over a range of depths of the borehole penetrating the earth formation. The method may also include making the at least one limited aperture measurement during drilling operations. The at least one limited aperture measurement may be at least one of: (i) a compressional wave velocity and (ii) a shear wave velocity.

The method may include marking a selected depth of the borehole as being in a principal stress plane of the earth formation if, at the selected depth, the magnitude of the difference between the principal direction of the near field stress and a normal to the principal direction of the far field stress is less than about 3 degrees.

The method may include estimating a magnitude of a principal stress of the formation using a relation between a velocity of a fast shear mode, a velocity of a slow shear mode, and a relation between the velocity of the fast shear mode, the velocity of the slow shear mode, and two principal stresses in the formation.

The method may include conducting a further operation selected from: (i) determining a completion type, (ii) designing a completion type, (iii) designing a casing for completion, (v) determination of economic value of a reservoir, and (vi) evaluation of a risk in pore pressure prediction.

Another embodiment of the present disclosure is an apparatus for characterizing an earth formation comprising: a logging tool configured to obtain at least one limited aperture measurement at frequencies greater than 20 kHz in a measurement borehole penetrating the earth formation; and at least one processor configured to: (i) estimate a principal direction of a near field stress near the borehole using the at least one limited aperture measurement; (ii) obtain a magnitude of a horizontal principal stress; (ii) use the estimated principal direction of the near field stress and the magnitude of the horizontal principal stress to estimate a principal direction of a far field stress; and (iv) use the principal direction of the far-field stress to predict propagation of a hydraulic fracture to be produced in the formation. The apparatus may include a conveyance device configured to convey the logging tool into the measurement borehole, the conveyance device selected from: (i) a wireline, and (ii) a drilling tubular. The at least one processor may be configured to predict a predominant azimuth of the hydraulic fracture. The at least one limited aperture measurement may be a series of measurements over a range of frequencies over a range of depths of the borehole penetrating the earth formation. The at least one limited aperture measurement may be at least one of: (i) a compressional wave velocity and (ii) a shear wave velocity. The at least one processor may be configured to conduct a further operation selected from: (i) determining a completion type, (ii) designing a completion type, (iii) designing a casing for completion, (v) determination of economic value of a reservoir, and (vi) evaluation of a risk in pore pressure prediction.

Another embodiment of the present disclosure is a non-transitory computer-readable medium product having stored thereon instructions that, when read by at least one processor, causes the at least one processor to execute a method, the method comprising: obtaining at least one limited aperture measurement at frequencies greater than 20 kHz in a measurement borehole penetrating the earth formation and obtaining a principal direction of a near field stress using the at least one limited aperture measurement; and obtaining a magnitude of a horizontal principal stress; using the principal direction of the near field stress and the magnitude of the horizontal principal stress to estimate a principal direction of a far field stress; and using the principal direction of the far-field stress to predict propagation of a hydraulic fracture to be produced in the formation.

BRIEF DESCRIPTION OF THE DRAWINGS

For detailed understanding of the present disclosure, reference should be made to the following detailed description of an exemplary embodiment, taken in conjunction with the accompanying drawing and in which.

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments.

The orientation of subsurface, or "in-situ," stresses of a formation are indicative of the direction of fracture propagation of an induced hydraulic fracture. Stresses acting on a subsurface formation at a distance greatly removed from the site of a hydraulic fracturing operation are known as "far-field" stresses. These stresses may be resolved into a maximum (or "greatest") far-field stress an intermediate far-field stress and a minimum (or "least") far-field stress. The directions in which these stresses act are referred to as the "principal stress directions" or the "directions of the principal stresses."

Aspects of the present disclosure relate to using measurements taken in a borehole intersecting an earth formation to predict the behavior of the formation or the wellbore. These measurements may include limited aperture or dipole acoustic measurements.

More particularly, techniques described herein include predicting fracture propagation using these measurements. In some examples, the behavior of the formation during a hydraulic fracturing operation may be modeled (for example, by computer simulation) and parameters of interest relating to the hydraulic fracturing may be estimated prior to the commencement of the hydraulic fracturing operation.

General embodiments are directed to using the principal direction of the near field stress, e.g., as estimated from limited aperture measurements in a borehole, and the magnitude of the horizontal principal stress to estimate a principal direction of a far field stress using techniques as described in greater detail below, and using the principal direction of the far-field stress to predict propagation of a hydraulic fracture to be produced in the formation.

Figure 1:
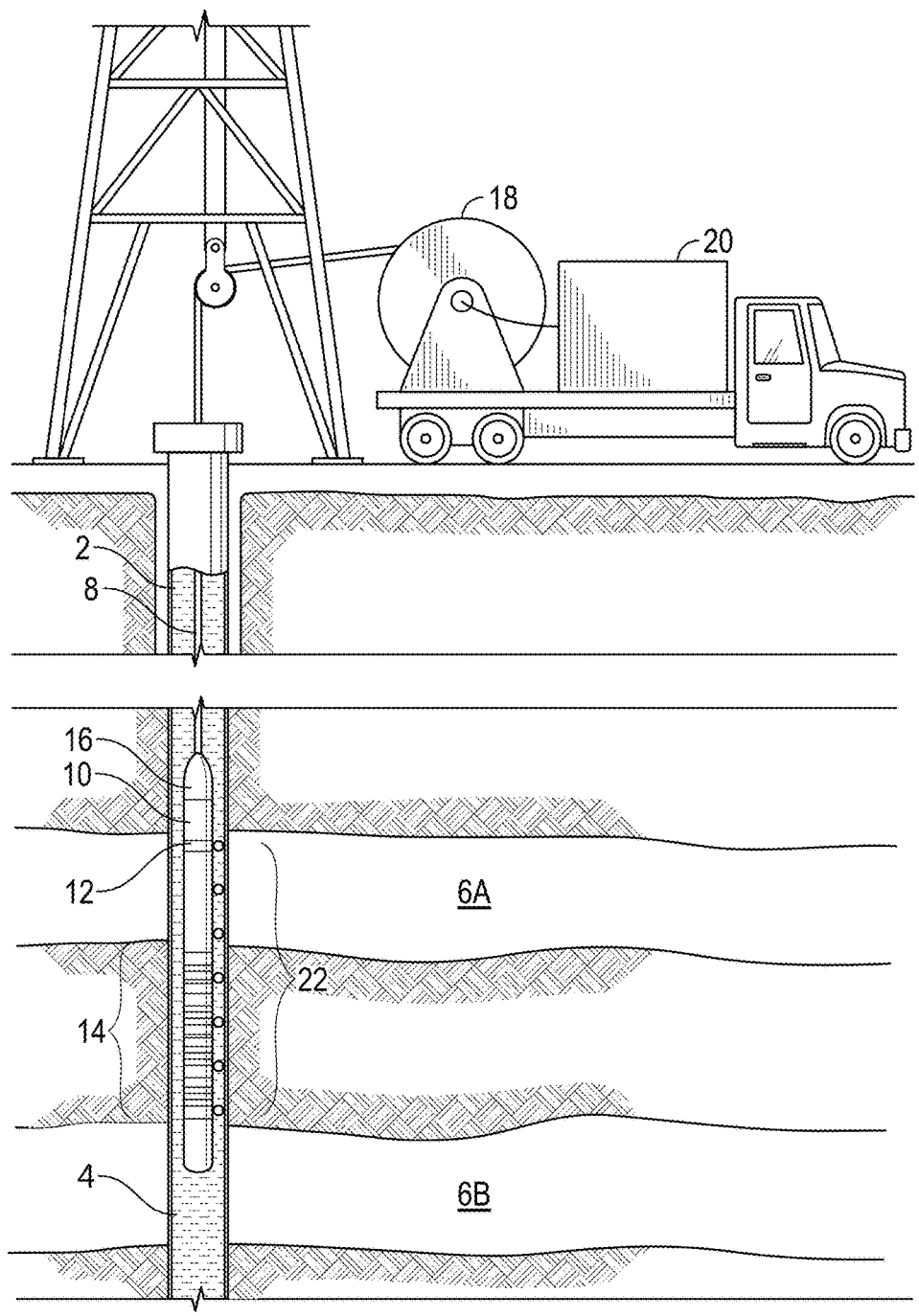
FIG. 1 shows a schematic illustration of a wireline logging system.

A well logging apparatus suitable for performing the limited aperture and dipole measurements disclosed herein is depicted in FIG. 1. Herein, a limited aperture measurement refers to an aperture that is narrow enough to define at least eight circumferential bins around a borehole. Obtaining the at least one limited aperture measurement may be carried out using at least one of: i) a limited aperture source; and ii) a limited aperture receiver. As is known to those of skill in the art of active source-detector systems, "limited aperture" and "limited frequency" refer to limiting the aperture of the complete measurement system and could be implemented either with a limited aperture/frequency source or a limited aperture/frequency receiver, or both. Some implementations may also use antenna design or filtering. Unless otherwise specified, the term "limited aperture" refers to limiting aperture through any or all of these techniques. The particular technique used to implement the limited aperture measurement will have associated advantages and disadvantages. There are benefits to a limited range receiver, such as reducing noise. There are also benefits to a limited range source, such as allowing all of the source energy to be concentrated in the useful range of frequencies and angles.

An acoustic array borehole logging tool, shown generally at 10, may be attached to one end of an armored electrical cable 8. The cable 8 may be extended into a borehole 2 penetrating earth formations, as shown generally at 6A and 6B. A winch 18, or similar device known to those skilled in the art, may extend the cable 8 into the borehole 2. The borehole 2 is typically filled with a liquid 4 which is known to those skilled in the art as "drilling mud", or similar fluid. The liquid 4 enables transmission of acoustic energy from the tool 10 outwardly to the wall of the borehole 2.

Acoustic transmitters 12 are disposed on the tool 10 and shown generally at 12. These transmitters 12 may include, but are not limited to, dipole sources, monopole sources, ultrasonic horns, and sources coupled to the borehole wall. The transmitters 12 may periodically emit acoustic energy pulses 22. The pulses 22 typically travel radially outwardly from the transmitter 12 through the fluid 4 in the borehole 2 until they strike the wall of the borehole 2. The pulses 22 then typically travel along the borehole 4 wall. Some of the acoustic energy returns to the fluid 4 in the borehole 2 and can be detected by a plurality of receivers 14 that may be disposed axially on the tool. Typically, the receivers 14 are spaced apart from the transmitter 12. In some embodiments, the receivers 14 may include dipole receivers. In some embodiments, there may be as few as one transmitter 12 and as few as one receiver 14. The use of various types of receivers is known.

The receivers 14 generate electrical signals corresponding to the amplitude of the acoustic energy reaching the receivers 14. In some embodiments the receivers 14 may include limited aperture receivers configured for logging-while-drilling (LWD). In other embodiments the transmitters 12 may include separate high and low frequency transmitters where the high frequency transmitters may correspond to the dipole receivers and the low frequency transmitters may correspond to the limited aperture receivers. Alternatively, the high frequency transmitters may correspond to the limited aperture receivers and the low frequency transmitters may correspond to the dipole receivers. In still other embodiments the transmitters 12 may only operate at low frequencies. It should further be noted that a limited aperture measurement may be obtained using a single monopole source in contact with the borehole wall and a single receiver. Furthermore, a limited aperture measurement may also be obtained using a single dipole source and a single dipole receiver.

An acoustic array borehole logging tool 10 typically includes signal processing electronics 16 which may digitize the signals from the receivers 14 and impart the digitized signals to the cable 8. Signals imparted to the cable 8 may be transmitted to a processor 20 at the surface. Theory and implementation of obtaining principal stresses and estimating the principal direction of a far field stress are described below.

It is well known that stress can change the shear velocities of a rock, and thus may induce anisotropy in the formation. For example, if a shear wave is propagating in a direction perpendicular to the direction of compressive stress, then the velocity of the shear wave polarized parallel to the direction of compressive stress may be larger than the shear wave polarized perpendicular to the direction of compressive stress. It follows then that if there are two perpendicular compressive stresses, $\sigma_x$ and $\sigma_y$, and the shear waves propagate along the z direction, then the velocities of the two shear waves polarized along the x and y directions can be expressed as:

$$\begin{cases} v_x^2 = v_{0x}^2 + S_{//}\sigma_x + S_\perp \sigma_y \\ v_y^2 = v_{0y}^2 + S_{//}\sigma_y + S_\perp \sigma_x \end{cases} \quad (1),$$

where $v_{0x}$ and $v_{0y}$ are the initial shear velocities polarized along the x and y directions without stress, and $S_{//}$ and $S_\perp$ are the stress-velocity coefficients. If the two stresses, $\sigma_x$ and $\sigma_y$, are different, then the velocities of the two shear waves are different as well. Thus, the anisotropy is induced.

From laboratory measurements it has been observed that sandstones usually have large stress-velocity coefficients. The values of $S_{//}$ and $S_\perp$ of the sandstones with high porosities are higher than those of the sandstones with low porosities; however, the values of $S_{//}$ and $S_\perp$ may be smaller in shale and may often be neglected.

Unlike the situation with intrinsic anisotropy, where the elasticity properties of a rock are homogeneous around a borehole, anisotropy induced by stress becomes a complicated issue when a borehole exists since the properties of the rock may no longer be homogeneous. For example, in a situation where an earth formation is under uniform stress before a borehole is drilled, after the borehole is drilled, the stress will redistribute around the near-borehole area. At an infinite distance, the stress may not change from its initial state. Assume that the borehole is drilled along the z direction through a linear elastic medium. Also consider that there are two stresses at infinity, $\sigma_x$ and $\sigma_y$, and a fluid at a pressure p inside borehole. The resulting stress around the borehole can be calculated analytically in cylindrical coordinates (r, θ) by:

$$\begin{cases} \sigma_r = \frac{\sigma_x + \sigma_y}{2}\left(1 + \frac{R^2}{r^2}\right) + p\frac{R^2}{r^2} + \frac{\sigma_x - \sigma_y}{2}\left(1 + 3\frac{R^4}{r^4} - 4\frac{R^2}{r^2}\right)\cos 2\theta \\ \sigma_\theta = \frac{\sigma_x + \sigma_y}{2}\left(1 + \frac{R^2}{r^2}\right) - p\frac{R^2}{r^2} - \frac{\sigma_x - \sigma_y}{2}\left(1 + 3\frac{R^4}{r^4}\right)\cos 2\theta \\ \sigma_{r\theta} = -\frac{\sigma_x - \sigma_y}{2}\left(1 - 3\frac{R^4}{r^4} + 2\frac{R^2}{r^2}\right)\sin 2\theta \end{cases} \quad (2)$$

where θ is the angle between r and x, and R is the borehole radius. Similar equations characterize the stresses around a non-linear elastic medium.

Figure 2A:
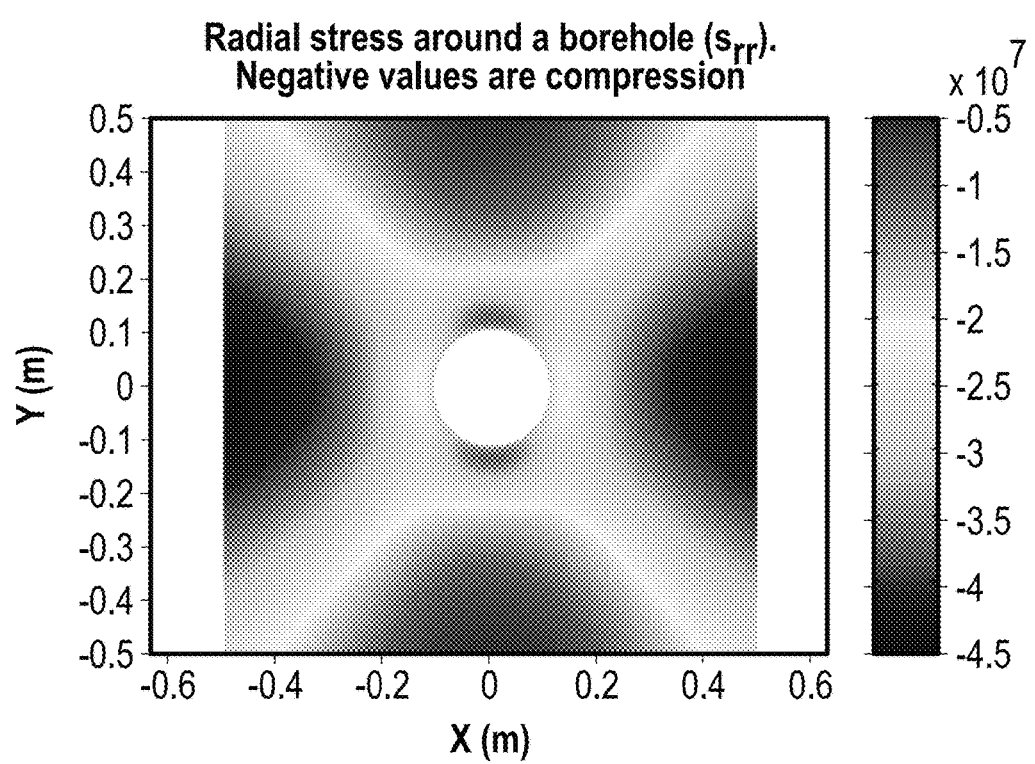
FIGS. 2A-2C shows the radial, tangential and azimuthal shear stresses around a borehole.
Figure 2B:
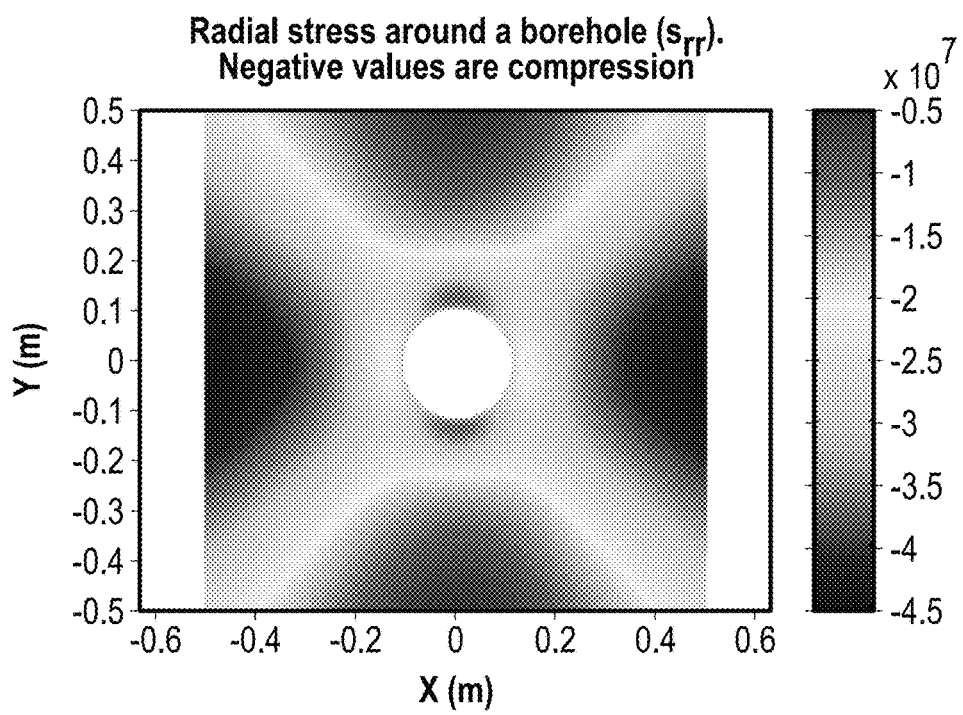
Figure 2C:
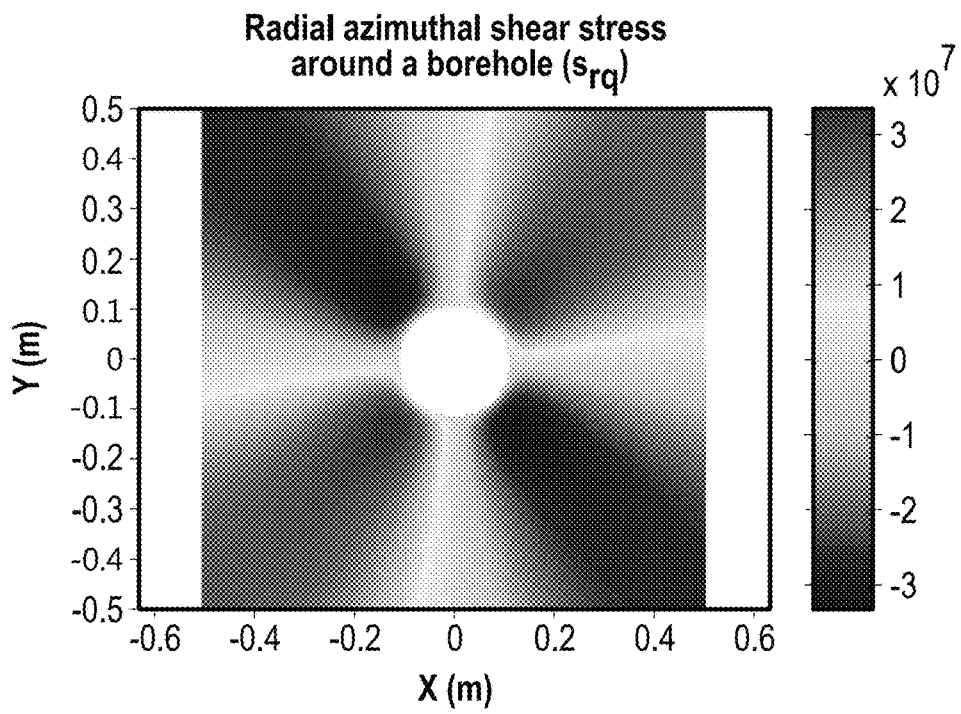

FIG. 2A shows the radial stress ($\sigma_{rr}$) around an exemplary borehole having a diameter of 8.5 inches (21.6 cm) when the initial stresses before the borehole was drilled were $\sigma_x=-50$ MPa (i.e., under tension) and $\sigma_y=30$ MPa. (Note: these values are for exemplary purposes only to illustrate the effects that may occur.) FIG. 2B shows the tangential stress ($\sigma_{\theta\theta}$) and FIG. 2C shows the radial-azimuthal shear stress ($\sigma_{r\theta}$). These figures show that the stress around the borehole varies in both azimuthal and radial directions.

Figure 3A:
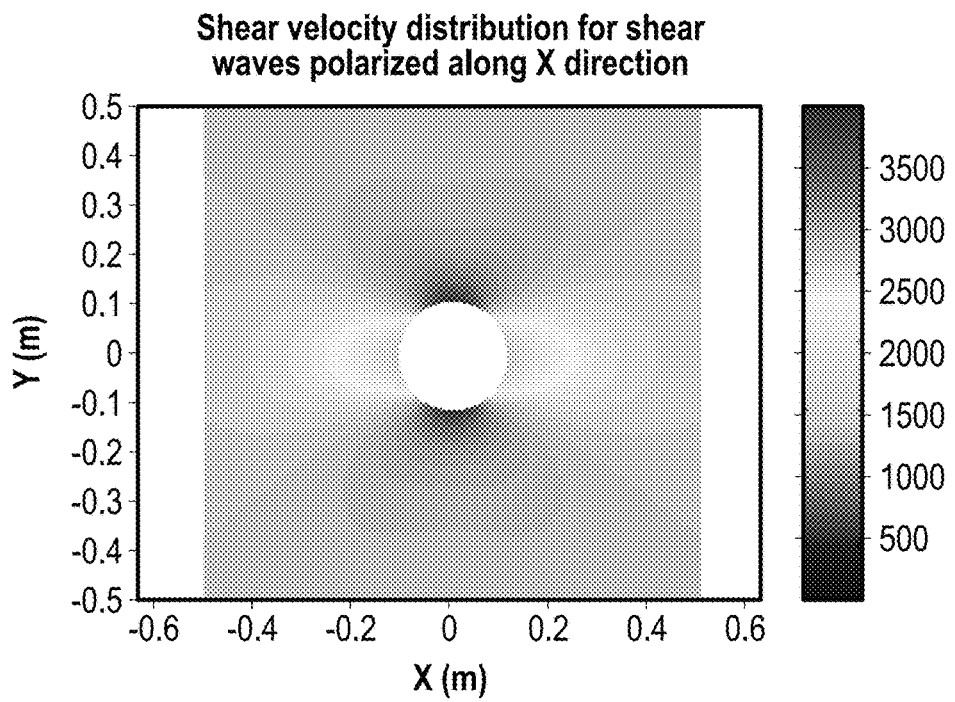
FIGS. 3A and 3B show plots of velocities of shear waves with x- and y-polarizations for the stress distribution of FIG. 2.
Figure 3B:
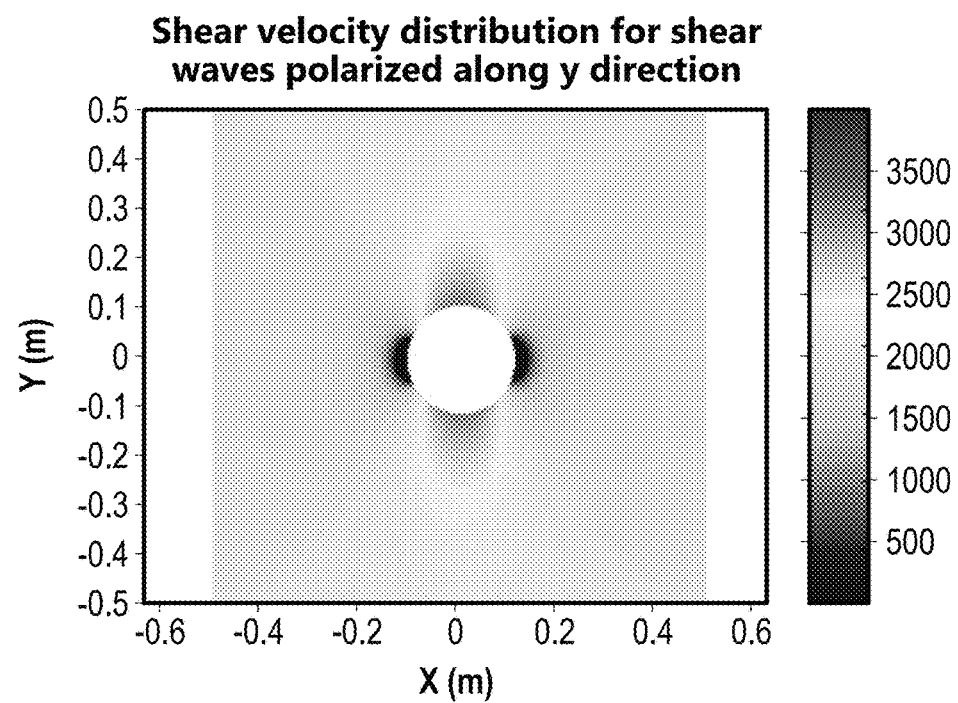
Figure 4:
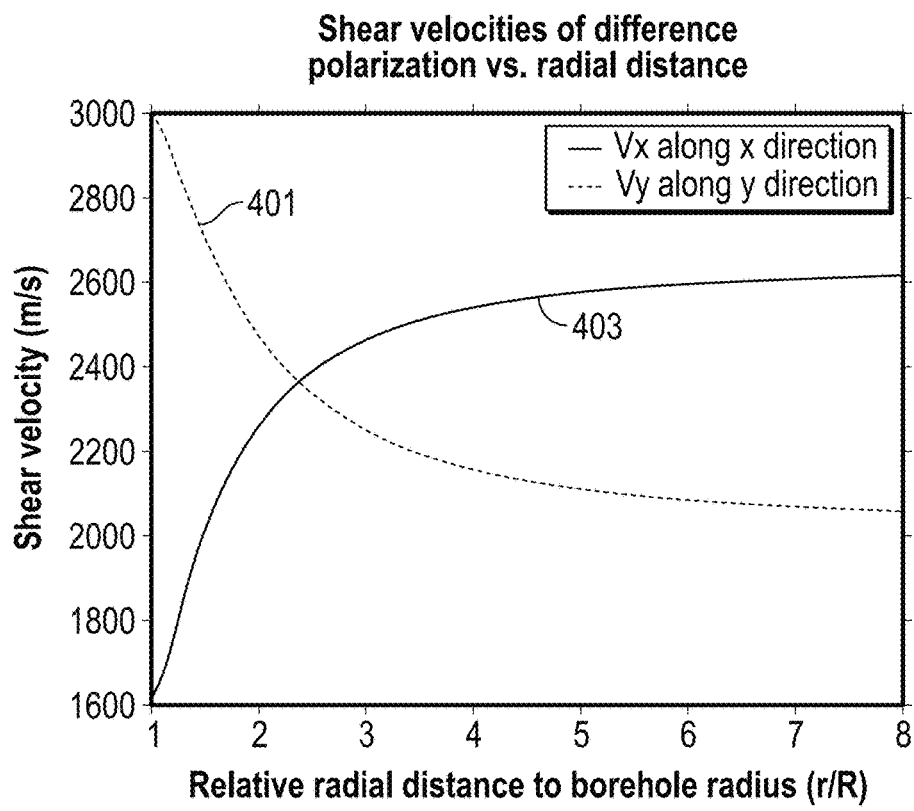
FIG. 4 illustrates the radial variation of the velocities of the fast and slow shear waves in a pre-stressed medium with a drilled borehole.

The complex distribution of stress around a borehole may cause variation of the velocities of shear waves with different polarizations. Consider an example where stress-velocity coefficients in eqn. (1) are: $S_{//}=89213$ (m/s)$^2$/MPa and $S\perp=31867$ (m/s)$^2$/MPa, which are typical of a sandstone, and the stress condition and borehole size are the same as the previous example. The distribution of the resulting velocities of vertically propagating shear waves with x- and y-polarizations are plotted in FIGS. 3A, and 3B respectively. These two figures have the same velocity-color mapping so that the velocities may be compared by the colors. As shown in FIG. 4, along the x direction the velocity of the x-polarized shear wave is larger at infinity than that near the borehole 403; however, along the y direction the velocity of the y-polarized shear wave is smaller at infinity than that near the borehole 401. The two curves of the two shear velocities cross over each other at a certain radial distance.

On the other hand, for a formation having intrinsic anisotropy, since the formation is homogenous there is no difference between the far-field or near-field velocities. The shear velocity should be constant for each wave with a particular polarization.

One way to distinguish these two kinds of azimuthal anisotropy is to identify if there is a difference between the far-field and near-field velocities and if the velocities vary azimuthally as well. In borehole acoustic logging, this may be achieved by using broad band frequency sources and receivers. The energy of a low frequency dipole mode can reach deep into an earth formation to obtain information from far away from the borehole. In contrast, the high frequency dipole mode may only be used to obtain information about the earth formation near the borehole.

In some embodiments, borehole acoustic logging may be achieved by using a low frequency cross dipole mode to obtain information that is distant from the borehole and limited aperture log data to explore the formation near the borehole. The limited aperture log data may include one or more near field measurements. In other embodiments, the limited aperture log data may be used to explore the formation near the borehole and be combined with prior acoustic logging information that characterizes the formation far from the borehole. Since the limited aperture logging may be performed while drilling, some embodiments enable the borehole acoustic logging to be performed in real-time. By using a limited aperture tool having a narrow aperture at high frequencies, it is possible to measure the compressional wave velocity in the earth formation as a function of azimuth. In contrast to conventional acoustic tools that operate in the frequency range of 2-10 kHz, a limited aperture tool may have a narrow aperture and can make high frequency measurements at frequencies such as 20-100 kHz.

Figure 5:
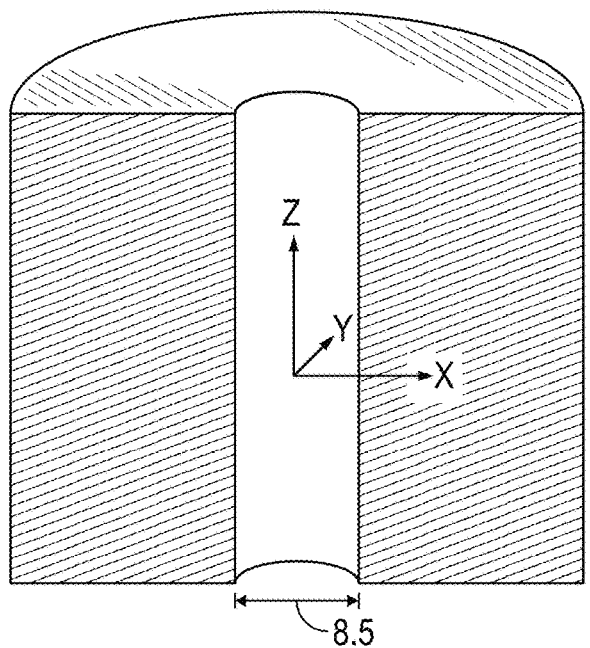
FIG. 5 shows a model used for a numerical simulation according to one embodiment of the present disclosure.

The exemplary borehole used for all of the models for numerical simulation is shown in FIG. 5 and has a diameter of 8.5 inches with either a fast or a slow formation around it. In a fast formation, the shear velocity is greater than the compressional wave velocity in the borehole fluid so that a recognizable shear wave can be detected by a logging tool. The borehole fluid is 13.5 PPG oil based mud, whose density is 1.62 g/cc and velocity is 1246 m/s (or slowness is 245 μs/ft). The positions of the acoustic sources and receivers in the model simulate those of an XMAC Elite® cross-dipole acoustic logging tool of Baker Hughes Incorporated.

Both layered media (such as shale) and formations with oriented fractures can be modeled by the intrinsic anisotropy models. Most of the anisotropic earth formations are considered to be transversely isotropic (TI) media. They have five independent elasticity constants. In order for the acoustic dipole logging to detect two distinct shear velocities, there must be an angle between the symmetry axis of the TI medium and the borehole axis. For purposes of simplicity, only the HTI configuration is considered because the two axes are perpendicular to each other. The elastic tensor of these media may be represented in the following form, $$C = \begin{bmatrix} c_{11} & c_{12} & c_{13} & 0 & 0 & 0 \\ c_{12} & c_{22} & c_{12} & 0 & 0 & 0 \\ c_{13} & c_{12} & c_{11} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{44} \end{bmatrix}, \quad (3)$$

where $c_{13}=c_{11}-2c_{55}$. The layers or fractures are parallel to x-z plane. Considering the shear waves propagating along the z axis (borehole axis), the speeds of shear waves polarized along x and y directions are $$v_{zx} = \sqrt{\frac{c_{55}}{\rho}}, \quad (4)$$

$$v_{zy} = \sqrt{\frac{c_{44}}{\rho}},$$

where ρ is the density of the formation. Usually, $c_{55}>c_{44}$ and $v_{zx}>v_{zy}$.

| | Density | Elastic Constants (GPa) | | | | | |
|---|---|---|---|---|---|---|---|
| | (g/cc) | $C_{11}$ | $C_{22}$ | $C_{12}$ | $C_{13}$ | $C_{44}$ | $C_{55}$ |
| Formation | 2.35 | 22.59 | 15.07 | 5.1 | 8.03 | 5.26 | 7.28 |

The equivalent velocity and slowness of these two models are:

| | P-wave velocity (m/s) | | Shear velocity (m/s) | | P-wave slowness (μs/ft) | | Shear slowness (μs/ft) | |
|---|---|---|---|---|---|---|---|---|
| | Fast | Slow | Fast | Slow | Fast | Slow | Fast | Slow |
| Formation | 3100 | 2532 | 1760 | 1496 | 98.3 | 120.4 | 173.2 | 203.7 |

A stress-induced anisotropy model may now be defined. To configure this stress-induced anisotropy model, an isotropic formation may be modeled using its two stress-velocity coefficients, $S_{//}$ and $S\perp$.

| | Density (g/cc) | P-wave velocity (m/s) | Shear wave velocity (m/s) | $S_{//}$ (m/s)²/ MPa | $S_\perp$ (m/s)²/ MPa | X direction horizontal compression (MPa) |
|---|---|---|---|---|---|---|
| Originally isotropic formation | 2.2 | 2900 | 1580 | 89213 | 31867 | 15 |

Figure 6:
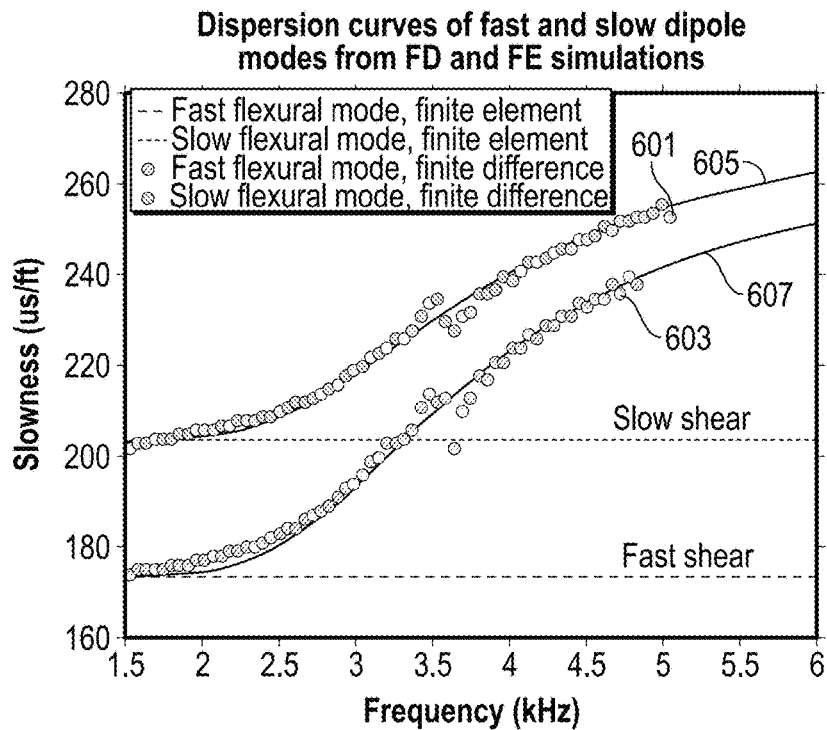
FIG. 6 shows the fast and slow shear wave dispersion curves for an intrinsic HTI formation obtained using exemplary finite difference and finite element simulations.

FIG. 6 shows an example of dipole modes for formations with intrinsic anisotropy. The 3D finite difference (FD) and finite element (FE) results for both the fast and slow dipole modes are shown in FIG. 6 for an HTI formation. In the above referenced model configuration, the fast dipole mode has its direction along the x axis. In the case of intrinsic anisotropy, the fast dipole mode remains as the fast mode polarized along the x direction in the entire frequency range, while the slow dipole stays as the slow mode with polarization along the y direction. The open circles, 601 & 603, are for FD modeling and the curves, 605 & 607, are for FE modeling.

Figure 7:
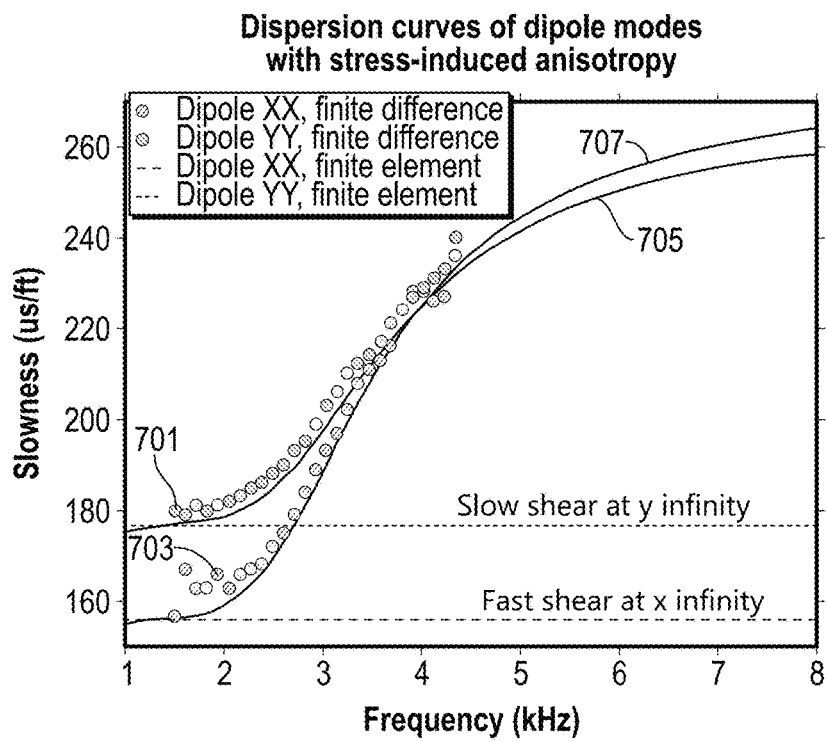
FIG. 7 shows fast and slow shear wave dispersion curves for a formation with stress-induced anisotropy.

FIG. 7 shows an example of stress-induced anisotropy in an earth formation. The 3D-FD, and 3D-FE results of both the fast and slow dipole modes are shown in FIG. 7. At low frequency, the XX dipole mode, 703 & 707, (polarized along x direction) reaches the fast shear velocity caused by the compression along the x direction, and the YY dipole mode (polarized along y direction) reaches the slow shear velocity, 701 & 705. At frequencies higher than 4 kHz, the XX dipole becomes the slow mode while the YY dipole becomes the fast mode. Therefore, the fast mode at high frequency is polarized along the y direction which is 90° different from the polarization direction (the x direction) of the fast mode at low frequency. The phenomenon of azimuthal polarization angle change of the fast dipole mode at low and high frequencies is unique to stress-induced anisotropy and can be used to distinguish it from intrinsic anisotropy.

Based on the above theory, one embodiment of the present disclosure processes the azimuthal angles of the fast dipole modes at both low and high frequencies and calculates the angle difference to identify the intrinsic or stress-induced anisotropy. This method may use an azimuthal anisotropy analysis program for borehole acoustics that may be configured to calculate the azimuthal polarization angles of fast and slow dipole waves, as well as the anisotropy magnitude.

The azimuthal anisotropy analysis program may be first applied to get the azimuthal polarization angle $\alpha_L$ of the fast dipole mode at low frequency (for example, between 0.5 kHz to 3 kHz). Next, the waveforms are filtered to keep the wave components of higher frequencies (for example, 4.5 kHz and higher) and the azimuthal anisotropy analysis program may be used to process them again. This time the azimuthal polarization angle of the fast dipole mode at high frequency is $\alpha_H$. According to the subject theory, if the anisotropy is caused by stress, then the difference between $\alpha_L$ and $\alpha_H$ is 90 degrees. If the azimuthal angle of the two fast dipole modes are almost the same (that is, the difference is close to 0 degrees), then the anisotropy is intrinsic or caused by fractures. Sometimes the angle difference might be away from both 0 and 90 degrees (for example, around 45 degrees). In this situation the dispersion curve cross-over method will have a difficulty in detecting the cross-over. Note that this disclosure does not need to calculate the fast and slow waveforms and does not need to calculate the dispersion curves.

The cross-over method requires the use of the two principal directions of the dipole waves (the azimuthal angle of fast and slow dipole waves) at low frequencies to separate the original waveforms into the fast and slow waves that contain high frequency components. In contrast, it is assumed herein that the two principal directions of low frequency waves are also the principal directions of the high frequency waves.

There is an implicit assumption in the foregoing that the orientations of the fast and slow dipole modes in the well as measured by the frequency-dependent dipole mode propagation properties do not vary slowly with distance from the wellbore wall, but rather that they may "flip" with the fast direction in the far-field becoming the slow direction close to the well. In fact, this "flip" in relative guided mode velocity with frequency is used as a diagnostic discriminator to differentiate between stress-induced anisotropy and anisotropy induced by earth layering. The aspect of the present disclosure which is discussed next does not make this assumption.

In one embodiment of the disclosure, an assumption may be made that the vertical stress is a principal stress. It is known in the art to estimate the magnitude of the vertical stress by computing the weight of overlying rocks and fluids, and it is possible to measure the minimum principal stress from hydraulic fracturing or from extended leakoff tests. When wellbore failures are detected, one can often constrain the stress magnitudes because the width of a breakout or the occurrence of a drilling-induced tensile fracture can be directly related to the stresses acting around the well, and model representations of these features can be expressed in a manner similar to an image log or as a cross-section cut perpendicular to the wellbore. By matching such a model to such an observation, it is possible to constrain stress magnitudes and orientations. In order to use such constraints on the magnitude of the maximum horizontal stress, the rock strength that resists failure should be known a priori; this is often difficult to determine, as is known to those of ordinary skill in the art.

Using the assumption that the vertical stress is a principal stress, the stress distribution around a deviated borehole can be modeled using methods known to one of skill in the art. The distribution of stresses around a deviated borehole is much more complex than the distribution of stresses around a vertical borehole discussed previously.

Figure 8:
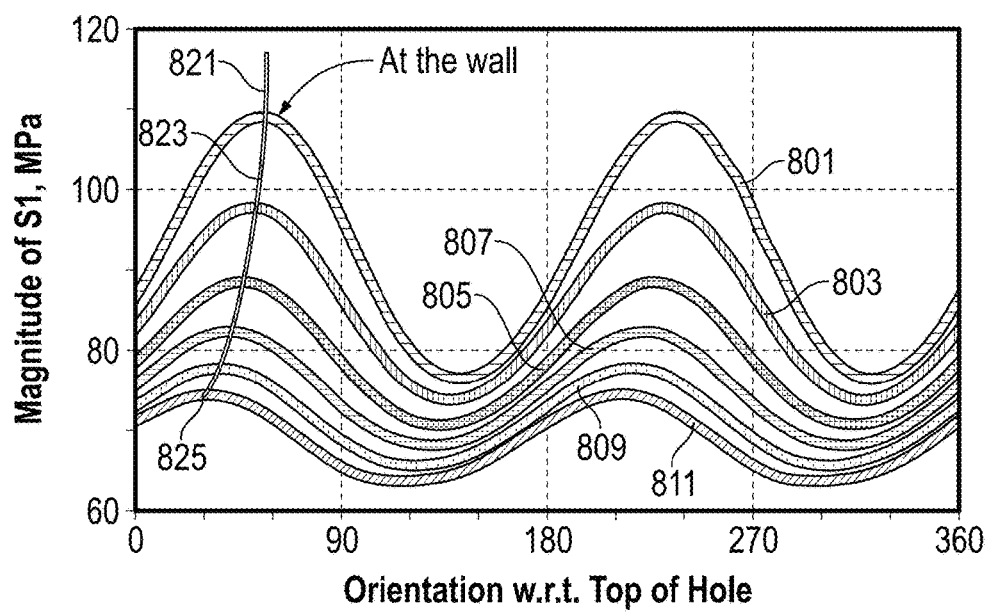
FIG. 8 shows an exemplary variation of one principal stress as a function of azimuth and distance for an exemplary deviated borehole.

Shown in FIG. 8 is the maximum principal stress S1 (ordinate) as a function of azimuth (abscissa) around an exemplary deviated borehole at distances equal to 1.01 R (801), 1.1 R (803), 1.2 R (805), 1.3 R (807), 1.4 R (809) and 1.5 R (811), where R is the radius of the borehole. Also shown in FIG. 8 is a curve 823 showing the azimuth as a function of distance from the well where the maximum principal stress is greatest for each radial distance. The difference in azimuth between the point 821 (which is on the borehole wall) of curve 823 and the point 825 of curve 823 (which is distant from the borehole wall) may not be 90 degrees.

Figure 9A:
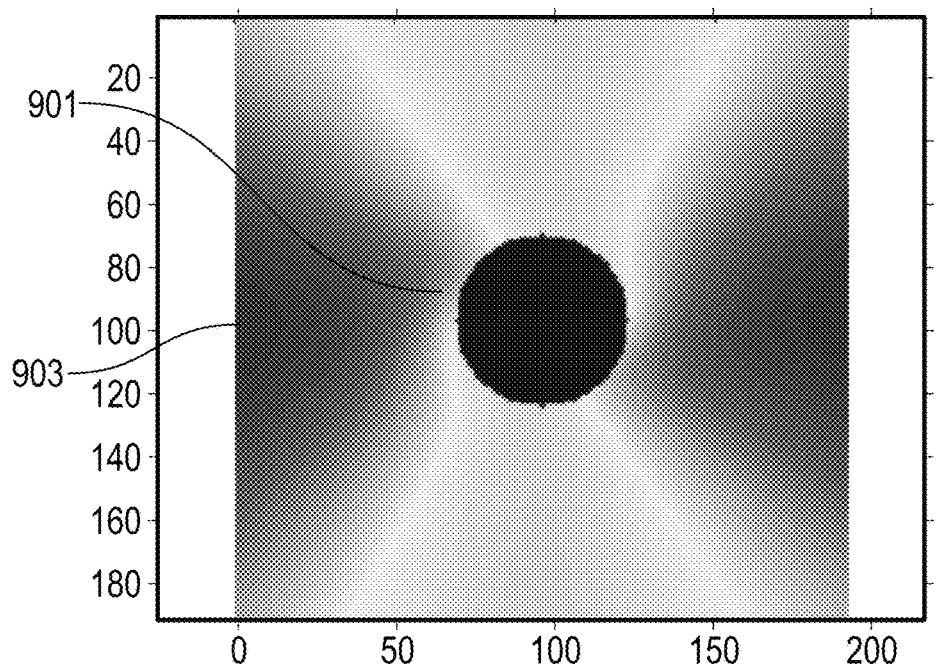
FIG. 9a shows the distribution of velocity of a shear wave polarized along the x-direction in a deviated borehole for the stress distribution of FIG. 8.
Figure 9B:
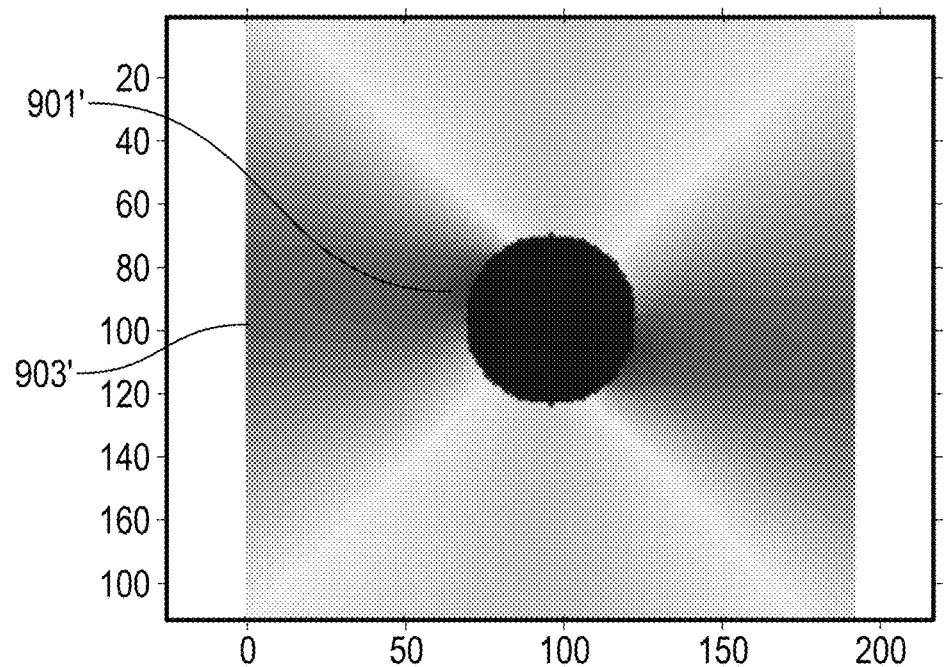
FIG. 9b shows the distribution of velocity of a shear wave polarized along the y-direction in a deviated borehole for the stress distribution of FIG. 8.

Using such a modeled stress distribution, it is possible to predict the velocities of elastic waves in the earth formation. FIG. 9a shows the distribution of shear wave velocities around the borehole for shear waves polarized in the x-direction corresponding to the exemplary stress distribution of FIG. 8. FIG. 9b shows the distribution of shear wave velocities around the borehole for shear waves polarized in the y-direction corresponding to the exemplary stress distribution of FIG. 8.

Referring again to FIGS. 9a-9b, it can be seen that the x-polarized shear wave at location 903 is faster than the y-polarized shear wave at location 903'. It can also be seen that x-polarized shear wave at location 901 is slower than the y-polarized shear wave at location 901'. Thus, a crossover as predicted by the simple model does occur. In contrast, FIGS. 9a and 9b also show that the azimuth angle at the borehole wall corresponding to the fastest and slowest velocities is not the same as the azimuth angle at the far offset, and the difference is not 90 degrees. The azimuthal P-wave velocity measurements made by a high frequency limited aperture tool discussed above allow for the determination of the orientation of the stress field near the borehole.

Instead of using a compressional wave velocity measurement, in a fast formation a direct measurement may be made of the shear velocity. In addition to the difference between the two directions not being 90°, there may be a gradual transition of the velocities from the borehole wall to the far distances thereby showing that there may not be a single crossover angle at which the slow and fast modes are interchanged.

Figure 11A:
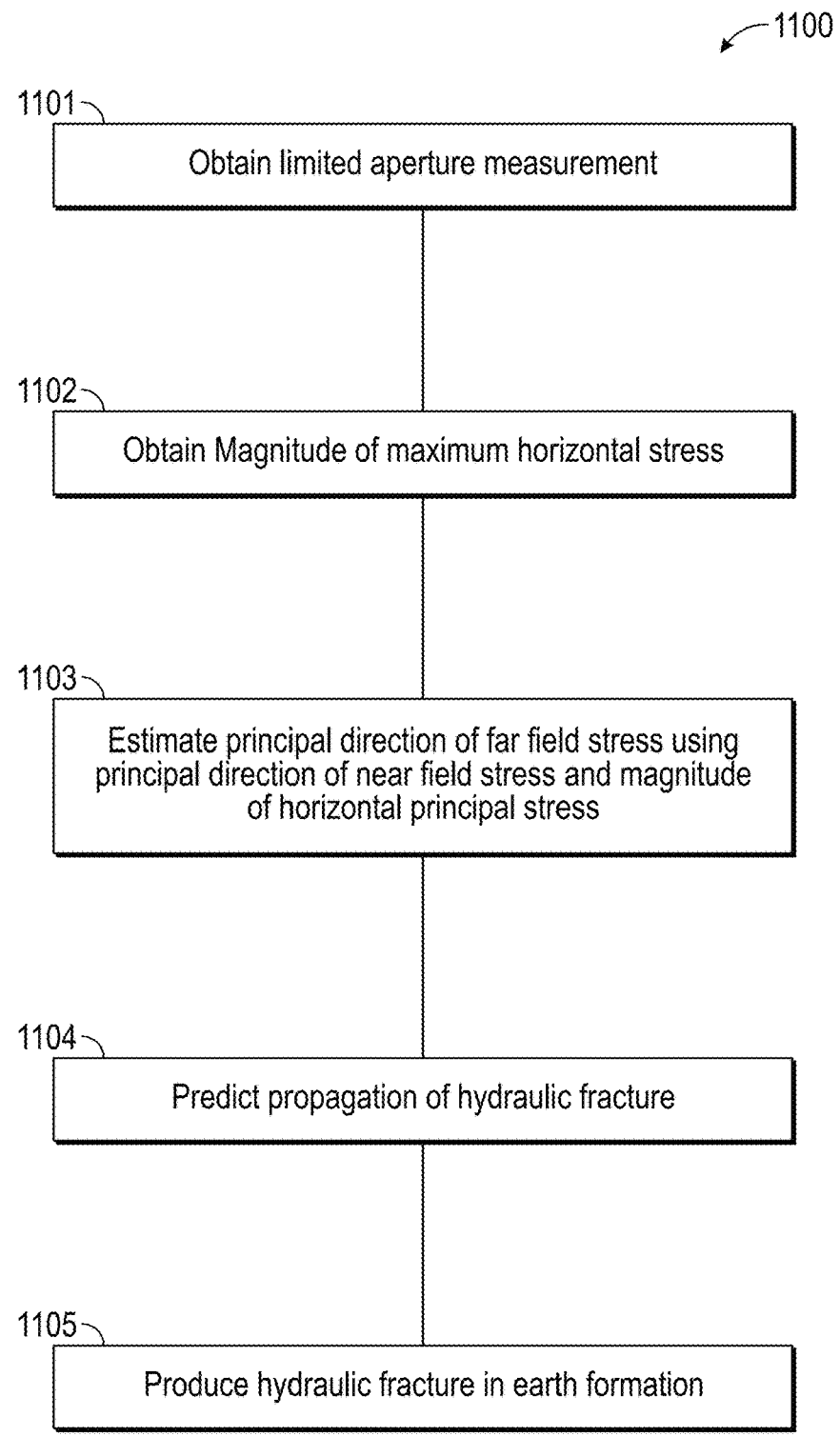
FIG. 11a is a flow chart illustrating some steps of one embodiment according to the present disclosure.

In one embodiment of the disclosure, evaluation 1100 proceeds according to the flow chart shown in FIG. 11a. Evaluation 1100 may be carried out using two inputs: i) an orientation of the near-field stress surrounding the borehole; and ii) the set of respective magnitudes of the three far-field principle stresses. As described below, it is known in the art to determine the set of respective magnitudes. Estimating the magnitude of the vertical (overburden) stress may be carried out by computing the weight of overlying rocks and fluids (e.g., by integration of the overburden density of the overlying rock, which may be accomplished by integrating a density log obtained in a borehole or a density profile derived from seismic inversion, or by other means).

The minimum principal stress magnitude may be found from fracture closure pressure, leakoff tests, and Eaton's or other known methods for pore pressure/fracture gradient prediction. For example, one technique includes applying increasing hydraulic pressure in a sealed-off interval to produce an axial fracture, occurring when circumferential stress produced by pressure and borehole-induced stress concentrations exceed the tensile strength of rock. The pressure required to initiate the fracture is a function of the orientation of the wellbore and the magnitudes of the far-field principal stresses, as well known in the art and embodied in "Compressive and tensile failure of inclined wellbores and determination of in-situ stress and rock strength" by Peska and Zoback (Peska, P., Zoback, M. D. Compressive and tensile failure of inclined wellbores and determination of in-situ stress and rock strength. J Geophys Res-Solid Earth 1995; 100:12791-811. The pressure required to extend the fracture away from the wellbore is controlled by the minimum far-field horizontal stress. In another technique, the minimum horizontal stress is approximated with instantaneous shut-in pressure of a hydraulic fracture after pumping is ceased.

In step 1101, at least one limited aperture measurement is obtained at frequencies greater than 20 kHz in a measurement borehole penetrating the earth formation and a principal direction of a near field stress is obtained using the at least one limited aperture measurement, as described above. For example, limited aperture log data may be acquired over a range of depths in the borehole. The measurement may reflect the compressional wave velocity in the earth formation as a function of azimuth around the wellbore. The limited aperture log data may be acquired during drilling or after drilling using a wireline-conveyed device. The limited aperture log data may be transmitted to a processor located at the surface or downhole.

In step 1102, a magnitude of a horizontal principal stress may be obtained. For example, the magnitude of the maximum horizontal stress can sometimes be determined from characteristics of wellbore failures, or other techniques.

Figure 10:
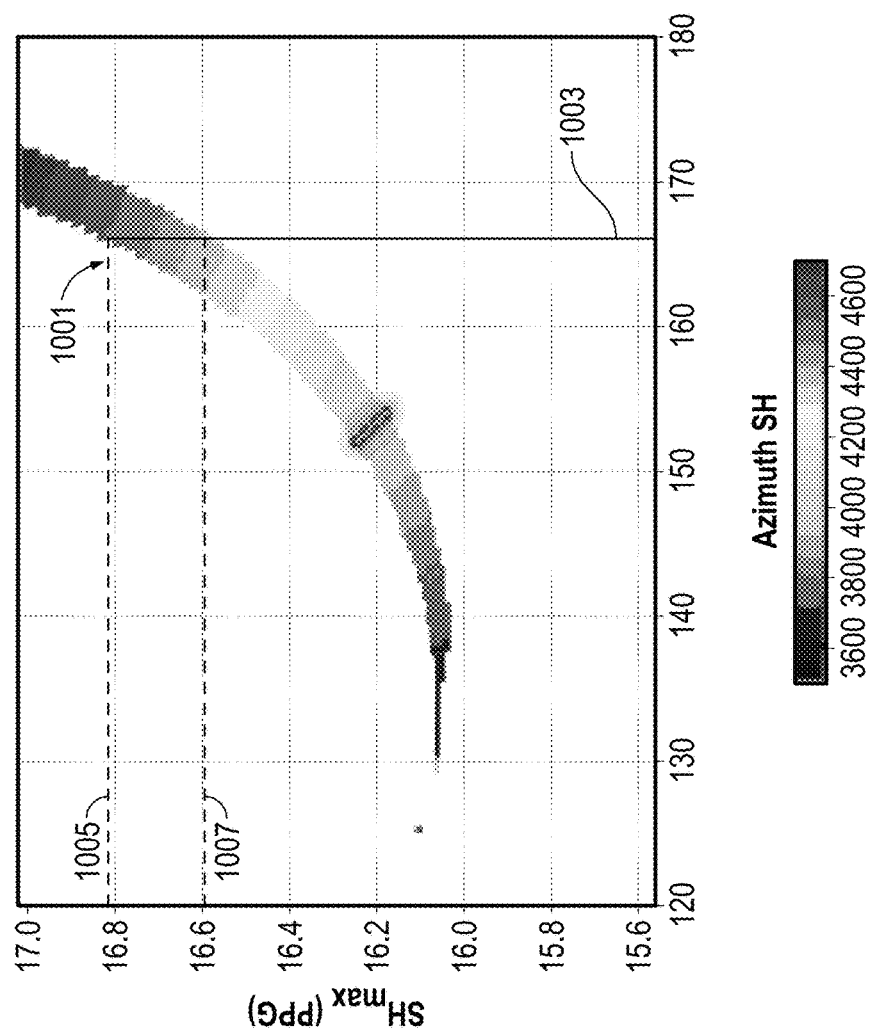
FIG. 10 shows constraints on the formation stress as a function of azimuth for the stress distribution of FIG. 8.

In step 1103, a principal direction of a far field stress is estimated using the principal direction of the near field stress and the magnitude of the horizontal principal stress, as shown in the discussion of FIG. 10.

In step 1104, propagation of a hydraulic fracture to be produced in the formation is predicted using the principal direction of the far-field stress. Hydraulic fracture may be produced in the formation by injection of a fracturing fluid in an injection borehole. Predicting propagation of the hydraulic fracture may be carried out using constraint analysis as described below and may include predicting a predominant azimuth of the hydraulic fracture.

Propagation of the hydraulic fracture may be predicted by modeling the earth formation (e.g., using a three-dimensional geomechanical model) and using the principal direction of the far-field stress as an input. Stresses acting on the formation and fracture flow properties may be incorporated into a time-based (e.g., incremental) flow simulation. Alternatively, propagation may be predicted using a special purpose-built heuristic, using a neural network (with the principal direction of the far-field stress as one of the inputs), and so on. The predicted fracture may then be used alone or as part of a larger simulation (e.g., as a constraint) in planning further operations associated with the borehole or the formation. In some aspects, the hydraulic fracture may be predicted.

Figure 11B:
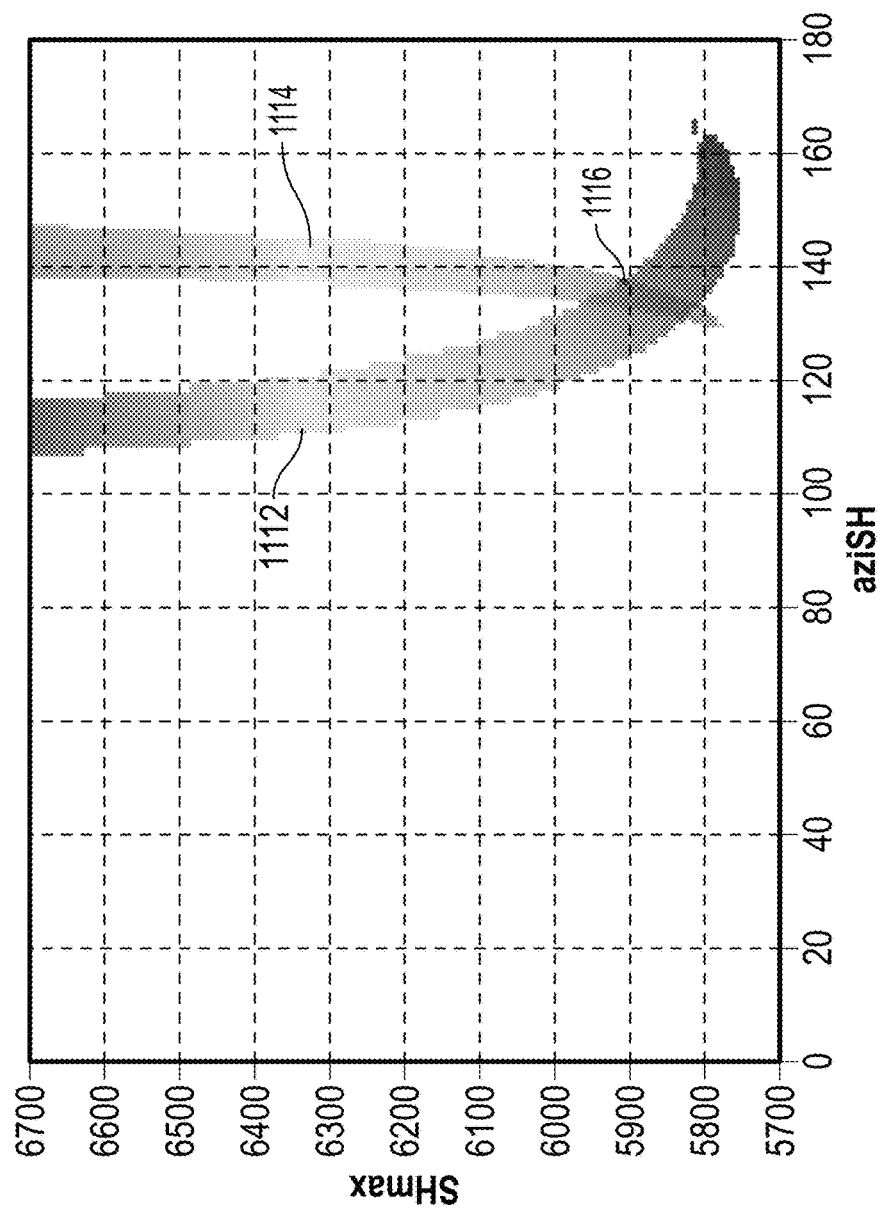
FIG. 11b illustrates techniques for using the principal direction of the far-field stress to predict propagation of a hydraulic fracture in accordance with embodiments of the present disclosure.

One approach is to determine from each of two boreholes the combination of far-field magnitude and direction that is consistent with the predetermined least stress, overburden, and near-field stress orientation in each well. For each borehole, a respective plot of far-field stress orientation with respect to far-field stress magnitude may be generated, as shown in FIG. 11b (below). The two (different) trajectories of the respective plots are then used to determine a solution, which is represented by the intersection of the trajectories.

Predicting the propagation of the hydraulic fracture enables optimization of the fracture, along with optimization and project planning of other related future operations in the borehole, the formation, or related formations. Accurate propagation prediction enables proper orientation of horizontal laterals to minimize breakdown pressure, maximize fracture connectivity in the near-wellbore, and create an ideal geometry for maximum coverage of the intervals between wells by the hydraulic fracture and accompanying stimulated rock volume.

In some embodiments stored data may be used in estimating parameters of interest. These data may be obtained by, for example, retrieving previously acquired data from a data repository, from local memory, or from other associated storage, or may be carried out by retrieving previously calculated or estimated parameters from such storage. In some embodiments, the data may be acquired at the same time as the acquisition of limited aperture log data of step 1101, while in other instances data may be acquired in separate periods. As one practical example, cross-dipole logs taken in connection with previous operations may be used as a source of data for some of the processes described herein.

In some embodiments, estimating constraints may include using knowledge of the wellbore orientation and/or relationships between far-field stress magnitudes and orientations and the orientations and magnitudes of stresses near a wellbore. In other embodiments, constraints may be estimated for relationships between two or more properties including, but not limited to, the following properties:
a. The far-field maximum principal stress magnitude
b. The far-field minimum principal stress magnitude
c. The far-field intermediate principal stress magnitude
d. Three angles that define the principal stress orientations, one description of which is:
  i. The inclination of the far-field maximum stress
  ii. The azimuth of the projection of the far-field maximum stress into a horizontal plane
  iii. The rake of the intermediate stress, S2 (that is, the angle from the horizontal to the intermediate stress in the S1-S2 stress plane).

Some embodiments may utilize the same mathematical methods as are described in Peska and Zoback, 1995. These methods and their application are discussed in Moos (2007) and Zoback et al. (2005). In one implementation that is not intended to be restrictive, plots such as are found in the Users' Manual of GMI•SFIB can be used to define relationships among unknown parameters. Other relationships between stresses in the far field and near the wellbore may be utilized, including relationships that relate stresses to physical properties of the rock or to changes in those physical properties A plot of the orientation of the fast dipole as a function of frequency within the ranges of each set of band-pass filtered data may reveal the amount of rotation. The angle at the highest frequency band may indicate the orientation near the wellbore wall and the angle at the lowest frequency band may be related to the orientation of the far field stress. If the difference is near 0 degrees, it is likely that the anisotropy is due to intrinsic properties of the formation and is not stress-induced. If the difference is near 90 degrees, then the difference may indicate that the anisotropy is stress-induced and that the well is likely drilled in a principal stress plane. Finally, if the difference is less than 90 degrees and more than 0 degrees, its value can be used to estimate properties of the stress field. The angles in the different frequency bands can be estimated by band-passing the cross-dipole data and performing a coordinate rotation. Details of the coordinate rotation are well known in the art. See, for example, Alford (1986). In one embodiment, the values of the velocities of the fast shear mode and the slow shear mode may be used to estimate the stresses. Eqn. (1) may be used for the purpose.

In another embodiment of the disclosure, the azimuth corresponding to the maximum stress at the borehole may be used to estimate upper and lower bounds on the stresses. Peska and Zoback disclose how to determine a stress magnitude from the rotation of a breakout azimuth away from the azimuth of the far-field maximum horizontal stress. Knowledge of this rotation allows one or more unknown properties of the stress field to be derived using a priori knowledge of other properties of the stress field. In the discussion that follows, it is assumed that the known properties are the magnitude of $S_v$, and the magnitude of $S_{hmin}$.

FIG. 10 is plotted assuming that the vertical stress is a principal stress, for simplicity and illustration. In FIG. 10, the abscissa is the azimuth of the far-field maximum horizontal stress and the ordinate is the magnitude of the maximum far-field principal stress in pounds per gallon equivalent density (PPG). The colored band 1001 on this plot corresponds to the only combination of azimuth and magnitude for which a breakout in a given orientation (in this case the orientation of 821 in FIG. 8), could form in a particular well with a known deviation and deviation azimuth and for a known overburden and least horizontal principal stress magnitude. The width of the band may be due to uncertainty in the azimuth of the breakout. Such uncertainty may be a known property of observations of breakouts in wells. One edge of the band may correspond to the stress parameters required to match one limit of the range of breakout azimuths and the other edge of the band may correspond to the stress parameters required to match the other limit of the range of breakout azimuths. In using the information contained in FIG. 10, if the azimuth of the far-field stress is uncertain, then two vertical lines corresponding to the upper and lower limits of the azimuths of the far-field stress can be used and the range of possible stress magnitudes may lie between the upper and lower bounds of the four points on the edges of the colored band 1001 corresponding to the intersections of each of these vertical lines.

The vertical stress can be found by integrating the density of overlying rock; the minimum principal stress magnitude can be found methods known to those of skill in the art, such as fracture closure pressure, leakoff tests, and Eaton's or other known methods for pore pressure/fracture gradient prediction. The wellbore orientation can be measured in a variety of ways, such as by conventional survey techniques.

The breakout orientation is the orientation at the wellbore where S1 is greatest (821). That direction is also the direction corresponding to the orientation around the well in FIG. 9 where the shear velocities may be greatest (901). The near-well orientation where the shear velocities are greatest may be the orientation where the near-well stress is greatest, which is typically where a breakout would form.

Because the breakout azimuth may be the same as the azimuth where the shear velocities are greatest (they are both controlled by the azimuth where S1 is greatest at the well) it is possible to replace the breakout azimuth as an input to analyses such as in FIG. 10 with the azimuth of the high-frequency fast dipole (901). i.e., the position of the colored band in FIG. 10 would be the same if the input were the azimuth of the high-frequency fast dipole or the high frequency limited aperture measurement of compressional or shear velocity instead of the azimuth of a breakout. This is an advantage over using a breakout azimuth to determine the azimuth near the well where S1 is greatest, because (1) breakouts do not always form, and (2) even if breakouts do form, it is not always possible to measure their azimuth.

Using the information derived from the dipole analysis (the azimuths of the low-frequency fast dipole and of the high-frequency fast dipole) or dipole-limited aperture analysis (the azimuths of the low frequency fast dipole and of the high frequency limited aperture), it may be possible to determine the maximum stress magnitude using the information in FIG. 10. In some embodiments, the azimuths of the low frequency fast dipole may be supplemented or replaced with azimuths obtained using, but not limited to, seismic measurements, hydraulic fracture data, and image logs.

FIG. 11b illustrates techniques for using the principal direction of the far-field stress to predict propagation of a hydraulic fracture in accordance with embodiments of the present disclosure. Measurements from two different boreholes (with different inclinations and azimuths) are used in a manner similar to FIG. 10. In FIG. 11b, the abscissa is the azimuth of the far-field maximum horizontal stress and the ordinate is the magnitude of the maximum far-field principal stress in pounds per gallon equivalent density (PPG). The intersection of the bands 1116 is the stress state consistent with both analyses. When conducted in two wellbores near to each other, the need for one of independent measurements that would otherwise be required to determine the stress state is removed. In cases where the trajectories do not intersect, the wells must be under different conditions of applied far-field stress.

In the same manner as described above for analyses using the breakout azimuth, the range of possible stress magnitudes may be due to the fact that the region of possible stress states has a finite width, the width having been computed from an uncertainty in the observed azimuth of the breakout or in the azimuth of the fast dipole at high frequency. Pairs of lines corresponding to the upper and lower limits of the range of orientations of the fast dipole mode at low frequency can be used to define the range of possible stress magnitudes that also account for uncertainty in the far-field stress orientation. Stress orientations may be obtained separately from stress magnitudes.

The example illustrated in FIGS. 9a-9b shows that given a stress distribution, it is possible to predict the distribution of shear velocities by azimuth, distance, and polarization. In one embodiment of the disclosure, a table lookup or other type of inversion is used to estimate the unknown parameters of the stress distribution from measurements of shear velocities. It is possible to use the difference between the near borehole (high frequency) and the far-field (low frequency) orientations to estimate the minimum and maximum horizontal stresses in the formation. The velocity measurements made at intermediate frequencies provide indications of the velocity at intermediate distances.

Figure 12:
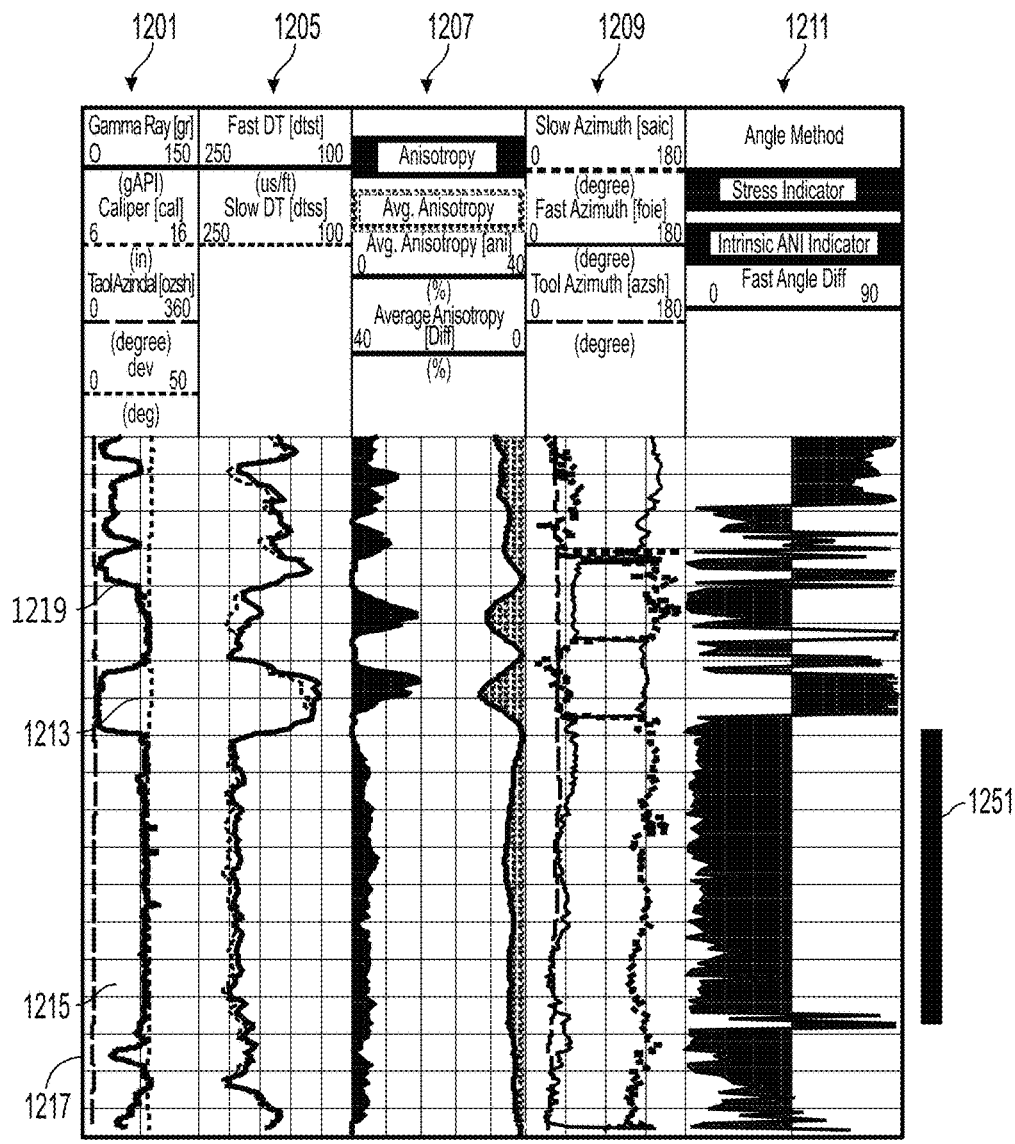
FIG. 12 shows data and results of processing in a vertical borehole that shows stress-induced anisotropy in sands and intrinsic anisotropy in shales.
Figure 12:
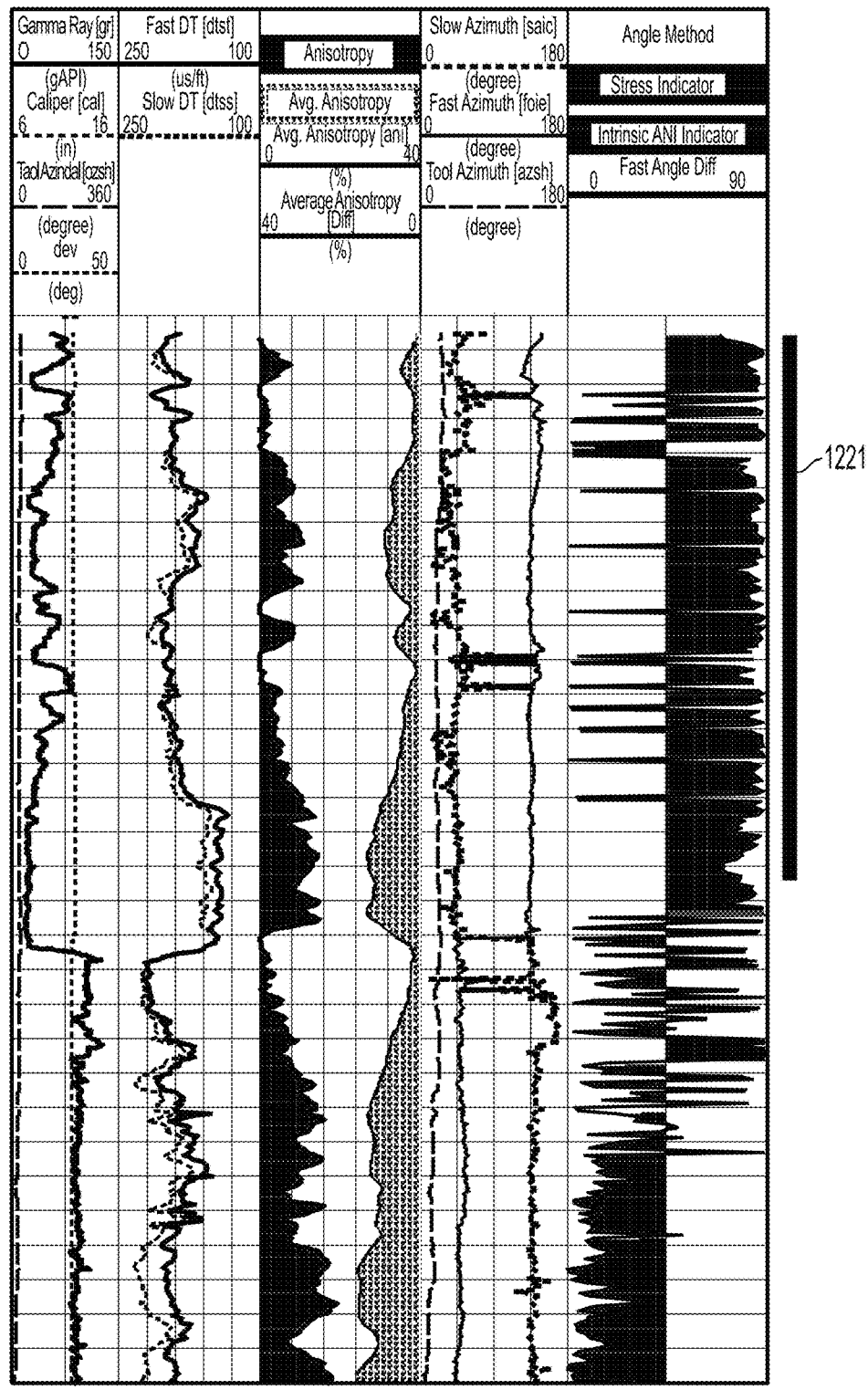

FIG. 12 shows an example of well logs acquired and processed with cross-dipole measurements. Track 1 1201 includes the gamma ray 1219 log which is an indication of shaliness. The caliper 1213 shows that the borehole has uniform gauge (12.5 inches). The tool azimuth 1215 is constant, showing that the tool is not rotating. The borehole deviation 1217 is close to 0 degrees. Track 3 1205 shows the slowness of the two shear waves. Track 4 1207 shows the estimated anisotropy at the borehole. Track 5 1209 shows the azimuths of the fast and slow shear waves at the borehole. Track 6 1211 is a plot of the difference between the azimuthal polarization angles $\alpha_L$ and $\alpha_H$ defined above. Values of the difference in angles 1221 near 0 degrees, approximately 3 degrees or less, are suggestive of intrinsic anisotropy while greater values are indicative of the presence of stress induced anisotropy; and there may still be intrinsic anisotropy. Values close to 90 degrees are indicative of stress-induced anisotropy of a wellbore drilled in a principal stress plane. Note that in the shale interval 1251 intrinsic anisotropy is indicated while in the sand 1221 below (see gamma ray log 1219), stress induced anisotropy is indicated.

Figure 13:
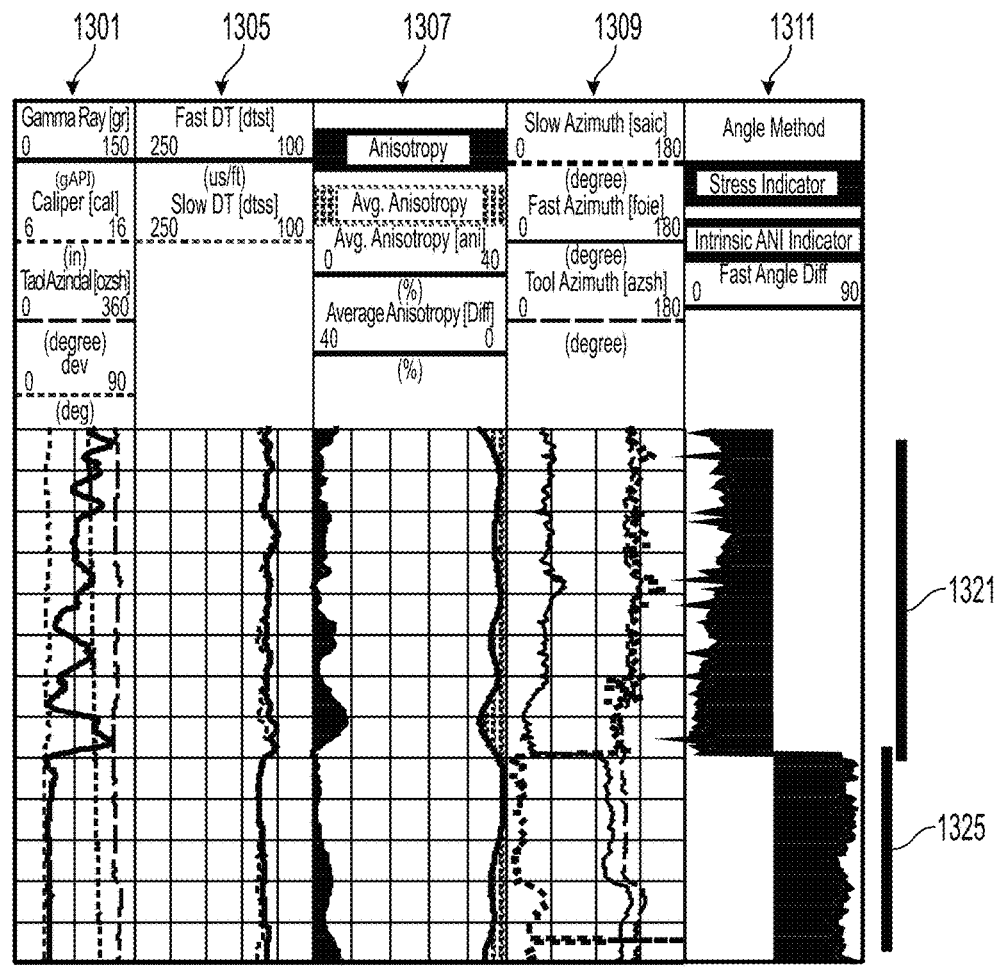
FIG. 13 shows data and results in a deviated borehole showing stress-induced anisotropy in sands and intrinsic anisotropy in shales.

FIG. 13 shows plots similar to FIG. 12 in a deviated well. Track 1 1301 includes the gamma ray, caliper, azimuth, and borehole deviation. Track 3 1305 shows the slowness of the two shear waves. Track 4 1307 shows the estimated anisotropy at the borehole. Track 5 1309 shows the azimuths of the fast and slow shear waves. Track 6 1311 is a plot of the difference between the azimuthal polarization angles $\alpha_L$ and $\alpha_H$. Note that in the upper, shaly, interval there is intrinsic anisotropy while in the lower, sandy interval stress-induced anisotropy is indicated. Note further that in the upper portion of the shale interval 1321 the difference is close to 20 degrees. This suggests that the shale interval also has some stress-induced anisotropy. An explanation of the difference close to 0° in the vertical shale interval 1251 in FIG. 12 is that the intrinsic anisotropy is much greater than the stress induced anisotropy.

Those versed in the art and having benefit of the present disclosure would recognize that the stress field in the subsurface is characterized by five quantities. These quantities are the three principal stresses and two angles. The present method works because the vertical principal stress can be estimated from integration of the density log. For measurements in a vertical borehole, one of the angles is known. The difference between the near field and far field stress directions provides a constraint using FIG. 10 to estimate the horizontal principal stresses. In some embodiments, near field stress direction and the magnitude of the horizontal principal stress may be used to estimate the direction of the far field stress.

Once the orientation and/or magnitudes of the principal stress directions have been determined, this information can be used to control further drilling operations. For example, U.S. Pat. No. 7,181,380 to Dusterhoft et al, having the same assignee as the present disclosure and the contents of which are fully incorporated herein by reference, teaches a process to determine optimal completion type and design prior to drilling of a hydrocarbon producing well. Moos (2006) discloses methods for selecting mud and casing design. Castillo et al (1987) disclose determination of maximum column height for assessment of the economic value of oil in place. U.S. Pat. No. 7,349,807 to Moos teaches the evaluation of risk in pore pressure prediction and its content is also fully incorporated herein by reference.

The present disclosure has been described above in terms of a wireline implementation, however, this is exemplary and illustrative only as the method of the present disclosure may also be used in other implementations such as in a measurement-while-drilling (MWD) implementation.

Figure 14:
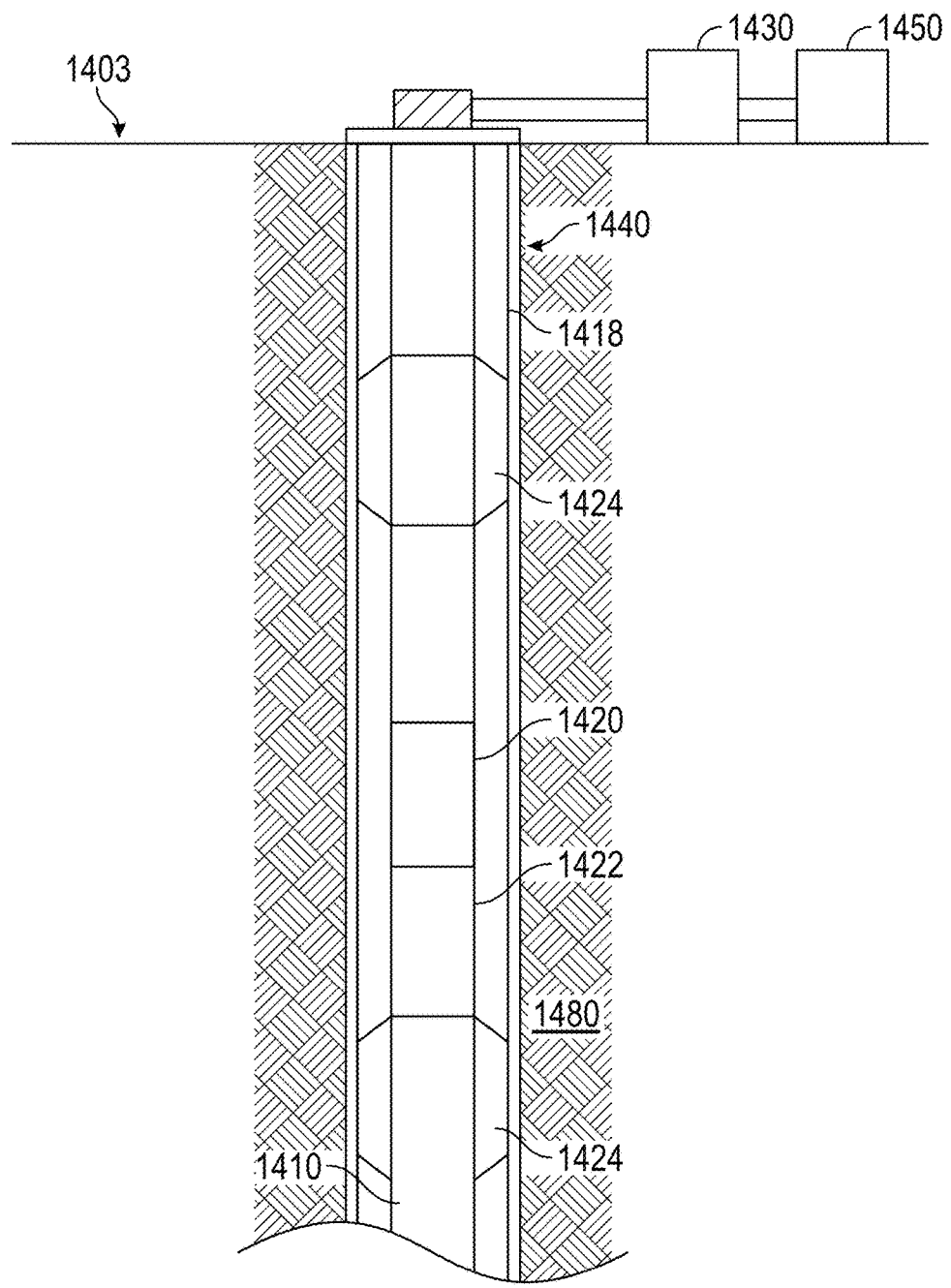
FIG. 14 illustrates a stimulation system for hydraulic fracturing operations in accordance with embodiments of the present disclosure.

FIG. 14 illustrates a stimulation system in accordance with embodiments of the present disclosure. The system 1403 includes a downhole tool string 1410, such as a stimulation string, wireline, or other carrier conveyed in a borehole 1440 surrounded by casing 1418. In one embodiment, the system 1403 is configured as a hydraulic stimulation system, but may also configured for additional functions such as hydrocarbon production, evaluation of the formation, evaluation of the borehole, and so on. As described herein, "stimulation" may include any injection of a fluid into a formation. An exemplary stimulation system may be configured as a cased or open hole system for initiating fractures and/or stimulating existing fractures in the formation. A fluid may be any flowable substance.

The tool string 1410 may include one or more tools or components to facilitate stimulation of the formation 1480. For example, the tool string 1410 may include a fracturing assembly 1420 including, e.g., injection nozzles and mechanical valve devices (e.g., fracturing sleeves, drop-ball devices, and so on). The tool string 1410 may include a perforation assembly 1422. The tool string 1410 may include additional components, such as one or more isolation components 1424 (e.g., packer subs, frangible barriers, etc.). Subs may include one or more processors or associated electronics configured to communicate with a surface processing unit and/or control the respective component or assembly. The system 1403 may be a hydraulic fracturing system that includes an injection device 1430 (e.g., a high pressure pump) in fluid communication with a fluid source 1450. The injection device 130 injects fluid into the string 1410 to introduce fluid into the formation 1480. Measurement and control devices, including one or more sensors responsive to pumping parameters, may be included for monitoring and control of the respective operation (e.g., hydraulic fracturing or other stimulation).

The processing of the measurements made in wireline applications may be done by the surface processor 20, by a downhole processor, or at a remote location. The data acquisition may be controlled at least in part by the downhole electronics. Implicit in the control and processing of the data is the use of a computer program on a suitable non-transitory machine readable-medium that enables the processors to perform the control and processing. The non-transitory machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. A method for characterizing an earth formation, comprising:
   obtaining at least one limited aperture measurement at frequencies greater than 20 kHz in a measurement borehole penetrating the earth formation and obtaining a principal direction of a near field stress using the at least one limited aperture measurement; and
   obtaining a magnitude of a horizontal principal stress;
   using the principal direction of the near field stress and the magnitude of the horizontal principal stress to estimate a principal direction of a far field stress; and
   using the principal direction of the far-field stress to predict propagation of a hydraulic fracture to be produced in the formation.

2. The method of claim 1 wherein the hydraulic fracture is to be produced in the formation by injection of a fracturing fluid in an injection borehole.

3. The method of claim 1 wherein predicting propagation of the hydraulic fracture comprises predicting a predominant azimuth of the hydraulic fracture.

4. The method of claim 1 wherein the at least one limited aperture measurement further comprises a series of measurements over a range of frequencies over a range of depths of the borehole penetrating the earth formation.

5. The method of claim 1 further comprising making the at least one limited aperture measurement during drilling operations.

6. The method of claim 1 wherein the at least one limited aperture measurement further comprises at least one of: (i) a compressional wave velocity and (ii) a shear wave velocity.

7. The method of claim 1 further comprising:
   marking a selected depth of the borehole as being in a principal stress plane of the earth formation if, at the selected depth, the magnitude of the difference between the principal direction of the near field stress and a normal to the principal direction of the far field stress is less than about 3 degrees.

8. The method of claim 1 further comprising estimating a magnitude of a principal stress of the formation using a relation between a velocity of a fast shear mode, a velocity of a slow shear mode, and a relation between the velocity of the fast shear mode, the velocity of the slow shear mode, and two principal stresses in the formation.

9. The method of claim 1 further comprising performing a formation modification operation in dependence upon the orientation.

10. The method of claim 1 further comprising conducting a further operation selected from: (i) determining a completion type, (ii) designing a completion type, (iii) designing a casing for completion, (v) determination of economic value of a reservoir, and (vi) evaluation of a risk in pore pressure prediction.

11. The method of claim 1 wherein obtaining the at least one limited aperture measurement comprises using at least one of: i) a limited aperture source; and ii) a limited aperture receiver.

12. An apparatus for characterizing an earth formation comprising:
    a logging tool configured to obtain at least one limited aperture measurement at frequencies greater than 20 kHz in a measurement borehole penetrating the earth formation; and
    at least one processor configured to:
       (i) estimate a principal direction of a near field stress near the borehole using the at least one limited aperture measurement;
       (ii) obtain a magnitude of a horizontal principal stress;
       (iii) use the estimated principal direction of the near field stress and the magnitude of the horizontal principal stress to estimate a principal direction of a far field stress; and
       (iv) use the principal direction of the far-field stress to predict propagation of a hydraulic fracture to be produced in the formation.

13. The apparatus of claim 12 wherein the hydraulic fracture is to be produced in the formation by injection of a fracturing fluid in an injection borehole.

14. The apparatus of claim 12 wherein the at least one processor is configured to predict a predominant azimuth of the hydraulic fracture.

15. The apparatus of claim 12 wherein the at least one limited aperture measurement further comprises a series of measurements over a range of frequencies over a range of depths of the borehole penetrating the earth formation.

16. The apparatus of claim 12 comprising a conveyance device configured to convey the logging tool into the measurement borehole, the conveyance device selected from: (i) a wireline, and (ii) a drilling tubular.

17. The apparatus of claim 12 wherein the at least one limited aperture measurement further comprises at least one of: (i) a compressional wave velocity and (ii) a shear wave velocity.

18. The apparatus of claim 12 wherein the at least one processor is further configured to conduct a further operation selected from: (i) determining a completion type, (ii) designing a completion type, (iii) selecting mud for drilling operations, (iv) designing a casing for completion, (v) determination of economic value of a reservoir, and (vi) evaluation of a risk in pore pressure prediction.

19. The apparatus of claim 12 further comprising:
a conveyance device configured to convey the logging tool into the borehole, the conveyance device selected from: (i) a wireline, and (ii) a drilling tubular.

20. A non-transitory machine-readable medium product having stored thereon instructions that, when read by at least one processor, causes the at least one processor to execute a method, the method comprising:
obtaining at least one limited aperture measurement at frequencies greater than 20 kHz in a measurement borehole penetrating the earth formation and obtaining a principal direction of a near field stress using the at least one limited aperture measurement; and
obtaining a magnitude of a horizontal principal stress;
using the principal direction of the near field stress and the magnitude of the horizontal principal stress to estimate a principal direction of a far field stress; and
using the principal direction of the far-field stress to predict propagation of a hydraulic fracture to be produced in the formation.

21. The non-transitory machine-readable medium product of claim 20 further comprising at least one of: (i) a ROM, (ii) an EPROM, (iii) an EEPROM, (iv) a flash memory, and (v) an optical disk.

* * * * *